Oct. 4, 1960 A. C. MAMO 2,954,672

HYDRODYNAMIC TORQUE TRANSMITTING DEVICE

Filed Aug. 22, 1955 19 Sheets-Sheet 1

Inventor:
Anthony C. Mamo
By: Frank C. Parker
Atty.

HYDRODYNAMIC TORQUE TRANSMITTING DEVICE

Filed Aug. 22, 1955

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 3

Inventor:
Anthony C. Mamo
By: Frank C. Parker
Atty.

Oct. 4, 1960

A. C. MAMO 2,954,672

HYDRODYNAMIC TORQUE TRANSMITTING DEVICE

Filed Aug. 22, 1955

19 Sheets-Sheet 4

←REV. FOR'D.→
ROTATION

Inventor:
Anthony C. Mamo
By: Frank C. Parker
Atty.

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 6

CONVENTIONAL CONVERTER.
MODIFIED FIG. 1 TYPE CONV.

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 7

—·—·— CONVENTIONAL CONVERTER.

——— FIG. 1 TYPE CONVERTER.

Inventor
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 8

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 9

— · — · — CONVENTIONAL CONVERTER.
———— FIG. 8 TYPE CONVERTER.

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 10

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 11

Inventor:
Anthony C. Mamo
By: Frank C. Parker
Atty.

Inventor:
Anthony C. Mamo
By: Frank C. Parker
Atty.

◎ EFFICIENCY LEVEL AND ⊕ TORQUE LEVEL } REQUIRED OF MODERATE SPAN CONV. IN ORDER FOR IT TO DELIVER SAME HORSEPOWER AS HIGH SPAN CONV. AT .8 SPEED RATIO.

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 14

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 15

Inventor:
Anthony C. Mamo
By: Frank C. Parker
Atty.

Inventor:
Anthony C. Mamo
By: Frank C. Parker
Atty.

Inventor:
Anthony C. Mamo
By: Frank C. Parker
Atty

HYDRODYNAMIC TORQUE TRANSMITTING DEVICE

Filed Aug. 22, 1955 19 Sheets-Sheet 18

———— CONVENTIONAL CONV.
-------- FIG. 1 TYPE CONV.
———— FIG. 24 TYPE CONV.

Inventor:
Anthony C. Mamo
By: Frank C. Parker
Atty.

Oct. 4, 1960 A. C. MAMO 2,954,672

HYDRODYNAMIC TORQUE TRANSMITTING DEVICE

Filed Aug. 22, 1955 19 Sheets-Sheet 19

Inventor:
Anthony C. Mamo
By: Frank C. Parker
Atty

United States Patent Office 2,954,672
Patented Oct. 4, 1960

2,954,672

HYDRODYNAMIC TORQUE TRANSMITTING DEVICE

Anthony C. Mamo, Detroit, Mich., assignor to Borg-Warner Corporation, Chicago, Ill., a corporation of Illinois Filed Aug. 22, 1955, Ser. No. 529,716

21 Claims. (Cl. 60—54)

The present invention relates in general to torque transmitting devices and more particularly to hydraulic torque converters of the type adapted to multiply and transmit torque to a load from a driving engine. The improved form of hydraulic torque converter disclosed herein is particularly suitable for use with a driving engine of the type ordinarily used in automotive vehicles.

The principal object of the present invention is to provide an improved hydraulic torque converter of the type having a plurality of vaned elements which together define a substantially toroidal fluid circuit and wherein the elements include vaned impeller means adapted to be drivingly connected with a driving engine for circulating fluid through the toroidal circuit to impart kinetic energy thereto, vaned turbine means disposed in the path of the circulating fluid for absorbing the kinetic energy from the fluid as it leaves the impeller means, and vaned stator means effective to change the direction of flow of the fluid leaving the turbine means and prior to its return to the impeller means for enabling infinite variation of torque conversion by the converter over a range varying from maximum torque conversion to minimum torque conversion which occurs when the clutch point of the converter is reached and during which condition the converter transmits torque at a substantially one-to-one ratio between the impeller means and the driven or turbine means.

More particularly, the present invention provides a hydraulic torque converter which includes, in addition to the conventional vaned impeller, turbine and stator means, multiple floater elements drivingly interconnected with each other and freely rotatable with respect to the impeller, turbine and stator means, said floater elements being effective to absorb kinetic energy at one point in the toroidal fluid circuit and give up this absorbed kinetic energy to the fluid at a different point in the toroidal circuit so as to provide the multiple advantages which will be described hereafter in the present specification.

It is well known that hydraulic torque converters in commercial use, in automotive vehicles particularly, provide adequate torque ratio at the lower speed ratio end of the torque conversion range at the expense of torque ratio at the higher speed ratio end of the torque conversion range near the clutch point.

An important object of the present invention is therefore to provide a hydraulic torque converter which is not only capable of delivering high torque to a load at the lower speed ratio end of the torque conversion range, but also is capable of providing torque multiplication over a greater range of speed ratios and thereby increasing the torque multiplication at the high speed ratio end of the torque conversion range of the torque converter.

In the automotive industry generally, the engines conventionally employed are designed to deliver increasing horsepower with increasing speed and, as a result, it is desirable to allow the engine speed to increase as rapidly as possible in order to provide maximum performance. Where this type of automobile engine is connected to the driving wheels of the automobile through the medium of a conventional hydraulic torque converter, it is common practice to tilt the stator blades in these torque converters as far forwardly as possible in order to impart a forward thrust to the hydraulic fluid immediately prior to its reentry into the impeller. As will be readily apparent, there are definite physical limitations to the degree of forward tilting which may be applied to the stator blades. These limitations arise by reason of the fact that as the blades are tilted more and more forwardly they physically approach each other and thus effectively block the flow of fluid out of the stator into the impeller. As a result, the degree of forward thrust which can be imparted to the fluid as it leaves the stator blades is definitely limited.

Further, it is well known that in conventional torque converters using a single set of stator blades these blades or vanes are incapable of directing the fluid into the impeller at other than substantially the same flow angle throughout the entire torque conversion range of the converter.

If the conventional converter were modified in order to improve performance near the converter clutch point by tilting the stator vanes so that they direct the fluid into the impeller with a greater than normal forward component, this would unload the impeller so that the engine would rotate at a higher speed over the entire torque conversion range. At stall, then, with this converter, the speed of rotation of the engine would be unacceptably high. This unloading of the impeller would also lower the torque handling capacity of the converter and prevent the delivery of the desired high torque at the low speed ratio end of the torque conversion range.

In order to provide a torque converter which is capable of absorbing high engine torques and delivering high torques to the load at the lower speed ratio end of the torque conversion range, the conventional stator blades could be designed so as to direct the fluid into the impeller with a lesser forward component. However, where a conventional torque converter is modified in this manner, the stator blades direct the fluid toward the impeller at such an angle as prevents the impeller from speeding up sufficiently to allow the engine to operate in a range where it is capable of delivering more horespower. Further, this modification of a conventional converter would decrease the torque ratio throughout the entire torque conversion range.

Accordingly, it is perhaps the most important object of the present invention to provide a hydraulic torque converter which is capable not only of delivering high torques during stall conditions of operation and at the lower speed ratio end of the torque conversion range, but is also capable of delivering torque multiplication at the relatively high speed ratio end of the torque conversion range near the clutch point with the engine operating in its rotational speed range where it is capable of delivering the most horsepower.

In one preferred embodiment of the torque converter comprising the subject matter of the present invention, a pair of vaned floater elements are disposed in toroidally spaced relation on opposite sides of a stator member and the vanes of the floater elements are so angularly disposed with respect to the vanes of the impeller, turbine and stator as to enable the floater element vanes to deflect the fluid slightly backwardly after it leaves the stator vanes and prior to its entry into the impeller vanes at the lower ratio end of the torque conversion range and to deflect the fluid slightly forwardly of its direction of flow upon leaving the stator vanes at the higher speed ratio end of the torque conversion range near the clutch point. This converter, when driven by a given engine, delivers more horsepower to the load.

With this construction of the hydraulic torque converter, the floater elements function to increase the load on the impeller at the lower speed ratio end of the torque conversion range to thereby enable the converter to absorb more torque from the driving engine and to deliver more torque to the load during stall conditions and during those conditions of relatively high torque multiplication and to unload the impeller so as to enable the driving engine and the impeller to speed up and cause the engine to deliver more horsepower as the torque converter approaches and finally reaches its clutch point.

As is well known, it is desirable, in order to provide better performance characteristics, to utilize a torque converter which multiplies torque over as great a range of speed ratios between the turbine and impeller as is possible. In a torque converter constructed in accordance with the principles of the present invention, the clutch point occurs at a higher speed ratio than in conventional torque converters and, accordingly, the range of torque conversion is greater than with conventional converters.

In the preferred embodiment of the present invention disclosed herein, the floater elements are capable of deflecting the fluid leaving the turbine slightly rearwardly at the higher speed ratio end of the torque conversion range near the clutch point so that in order for the fluid to enter the stator at the same angle at which it leaves, the fluid must leave the turbine at a substantially greater forward angle than it leaves the stator. This means that the torque conversion range is extended at the higher speed ratio end near the clutch point and thus, at the very portion of the range of operation of the converter where the vehicle functions most of the time, the converter provides the additional desired torque multiplication.

In the improved torque converters disclosed herein, the desirable operating characteristics mentioned heretofore are obtained by using the vaned floater elements for absorbing kinetic energy at one point in the toroidal fluid circuit and giving up this kinetic energy at another point in the toroidal fluid circuit. This has the effect of deflecting the fluid at the desired point in the toroidal fluid circuit in the desired direction in order to changes the normal operating characteristics of the converter and provide the advantages outlined above.

Accordingly, it is a more specific object of the present invention to provide a hydraulic torque converter comprising a plurality of relatively rotatable elements which together define a substantially toroidal fluid circuit and which comprise impeller means for imparting kinetic energy to the fluid and effecting circulation thereof to the toroidal circuit, turbine means for absorbing kinetic energy from the fluid, stator means for redirecting the fluid in a more forwardly direction after it leaves the turbine means so as to enable torque multiplication by the converter, and a plurality of floater devices disposed in toroidally spaced relation with respect to the impeller, turbine and stator means for absorbing energy from the fluid circuit and giving up energy to the fluid circuit at different toroidally spaced points therein and thereby deflecting fluid from the path which it would normally take to thus alter the operating characteristics of the converter.

In another broad aspect a primary object of the present invention is to provide infinite variation, between predetermined angular limits, in the direction of flow of the fluid entering one of the impeller, turbine or stator devices for thereby infinitely variably effecting the operation of the converter.

A more specific object of the present invention is to provide a hydraulic torque converter of the type having vaned impeller, turbine and stator devices and utilizing a pair of floater elements interconnected with each other for infinitely varying the direction of flow of the fluid entering the impeller over the entire range of operation of the converter so as to thereby increase the torque handling capacity of the torque converter, provide torque conversion over a greater range of speed ratios between the turbine and impeller and enable infinite variation in the unloading of the impeller as the speed ratio between the impeller and turbine increases to thereby enable the impeller to increase in speed and thus enable the driving engine to operate in a range where it is capable of developing more horsepower.

In the preferred embodiment of the invention disclosed herein, the two vaned floater elements are respectively disposed on opposite sides of the stator, with the vanes of the floater elements disposed between the turbine and stator lying at angles between the direction in which the fluid leaves the turbine during stall conditions and the direction in which the fluid leaves the turbine at the clutch point and with the vanes of the second floater, which is toroidally disposed between the stator and impeller, lying at angles having a slightly greater backward component than the outlet angles of the stator blades. With this construction, the two floaters cooperate during the lower speed ratio end of the torque conversion range and during stall conditions of operation to deflect the fluid leaving the stator somewhat backwardly. This increases the load on the impeller which, in turn, increases the amount of torque which the converter is capable of handling. At the higher speed ratio end of the torque conversion range and up to the clutch point, due to the fact that the fluid leaving the turbine strikes the first floater blades on their reverse sides and tends to drive the interconnected floaters forwardly, the two floaters are effective to deflect the fluid leaving the stator in a forward direction thereby tending to unload the impeller and enable its rapid speeding up which allows the driving engine to function in a range where it is capable of developing greater horsepower.

Modifications of the principal embodiment of the invention which are disclosed herein show that the floater element blades can be disposed at different angles so that the range of deflection of the fluid entering the impeller can be controlled in order to meet different operating requirements. Other modifications show that the principles of the present invention are applicable to other types of torque converters.

The foregoing and numerous other objects and advantages of the present invention will become apparent from the following detailed description, when read in conjunction with the accompanying drawings, wherein.

Figure 11:
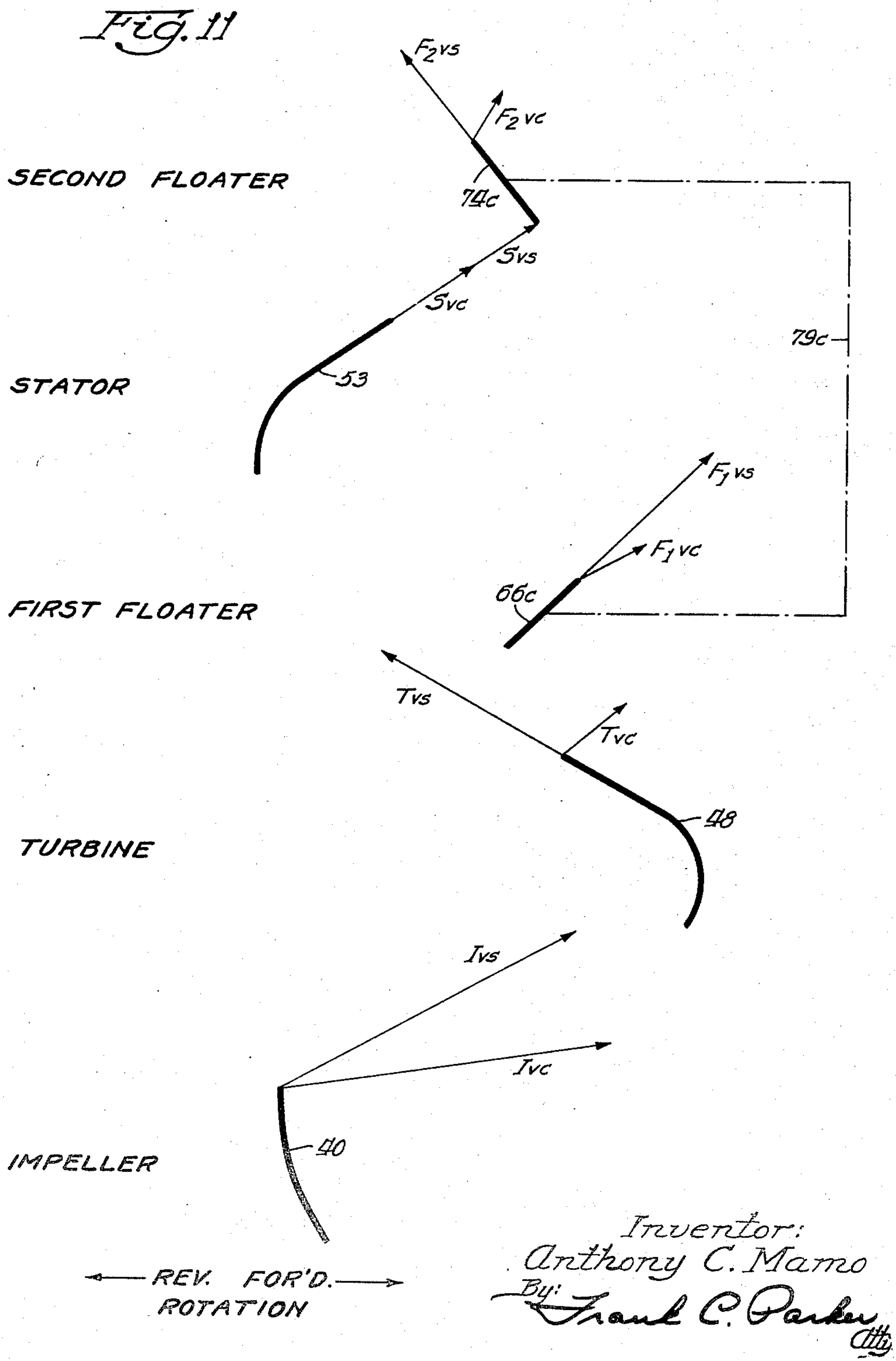
Figure 12:
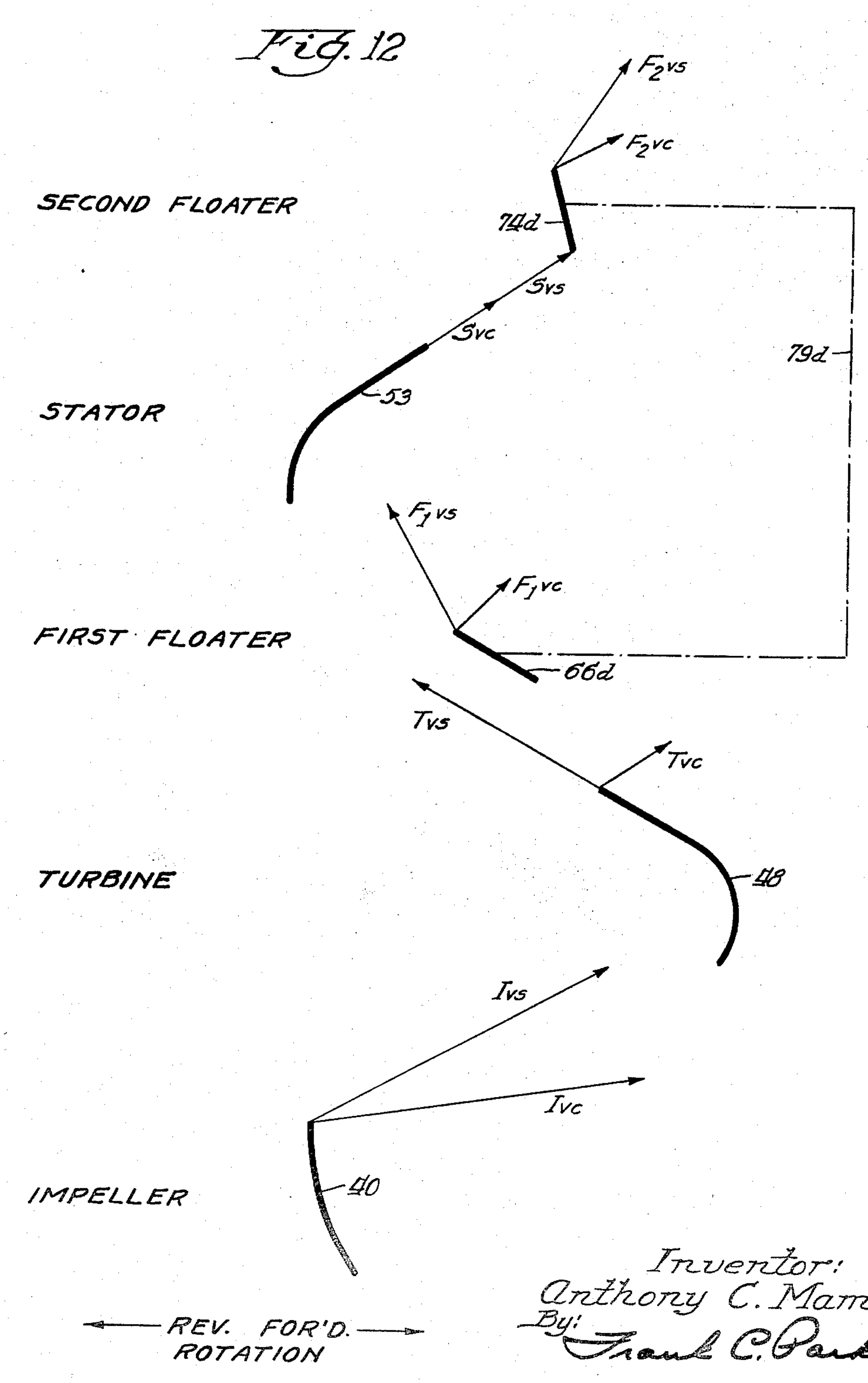
Figure 13:
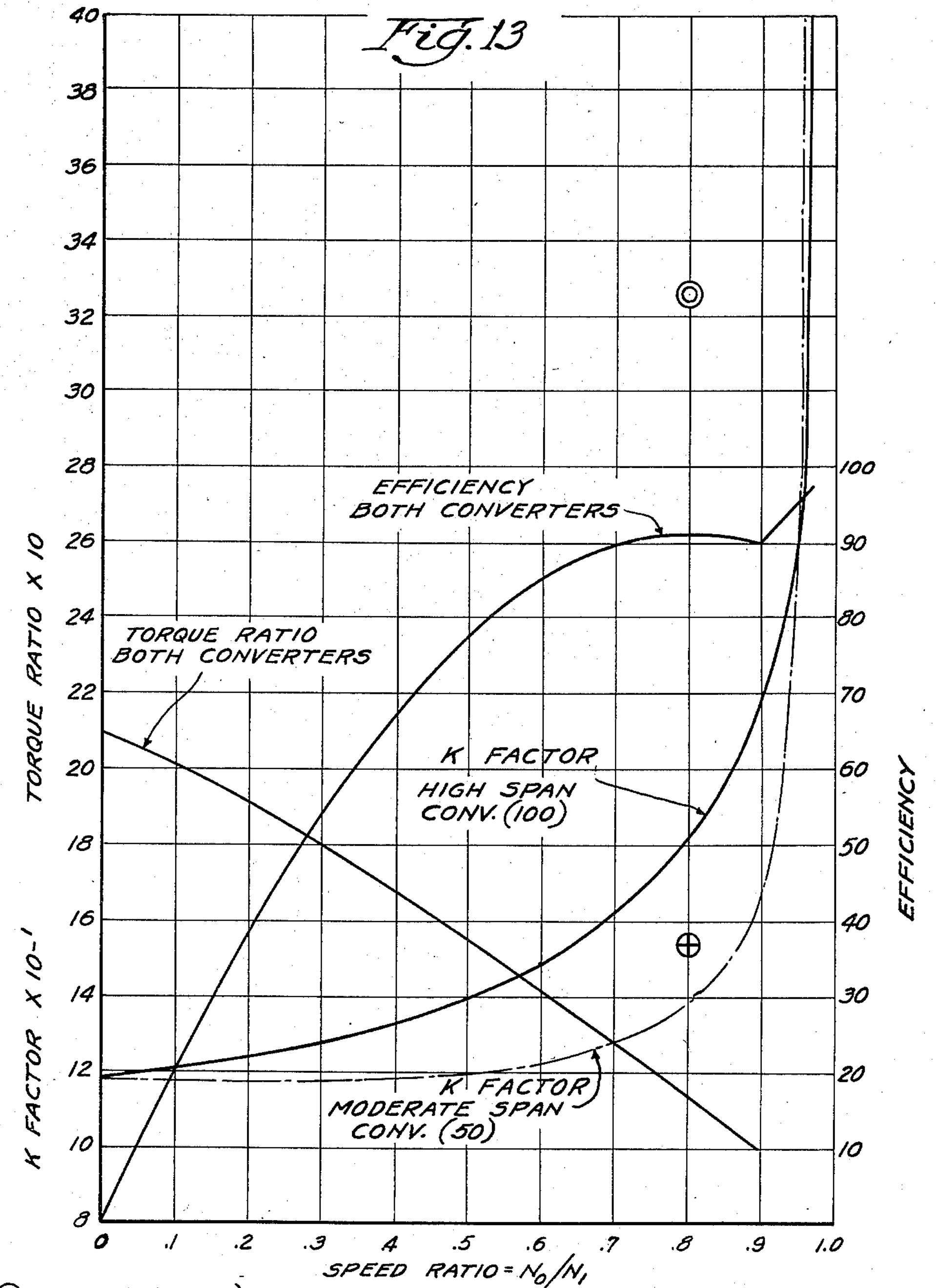
Figure 14:
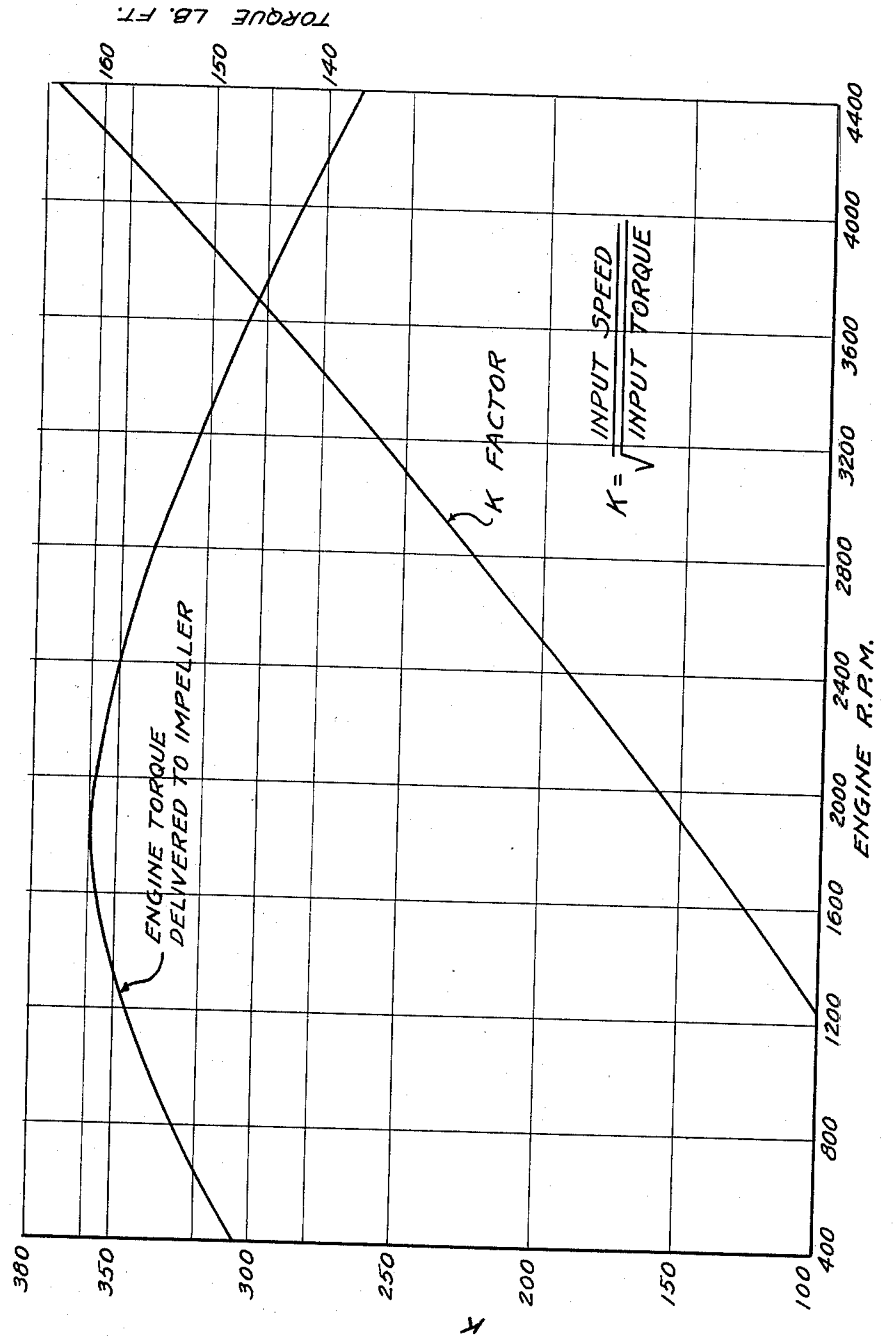
Figure 15:
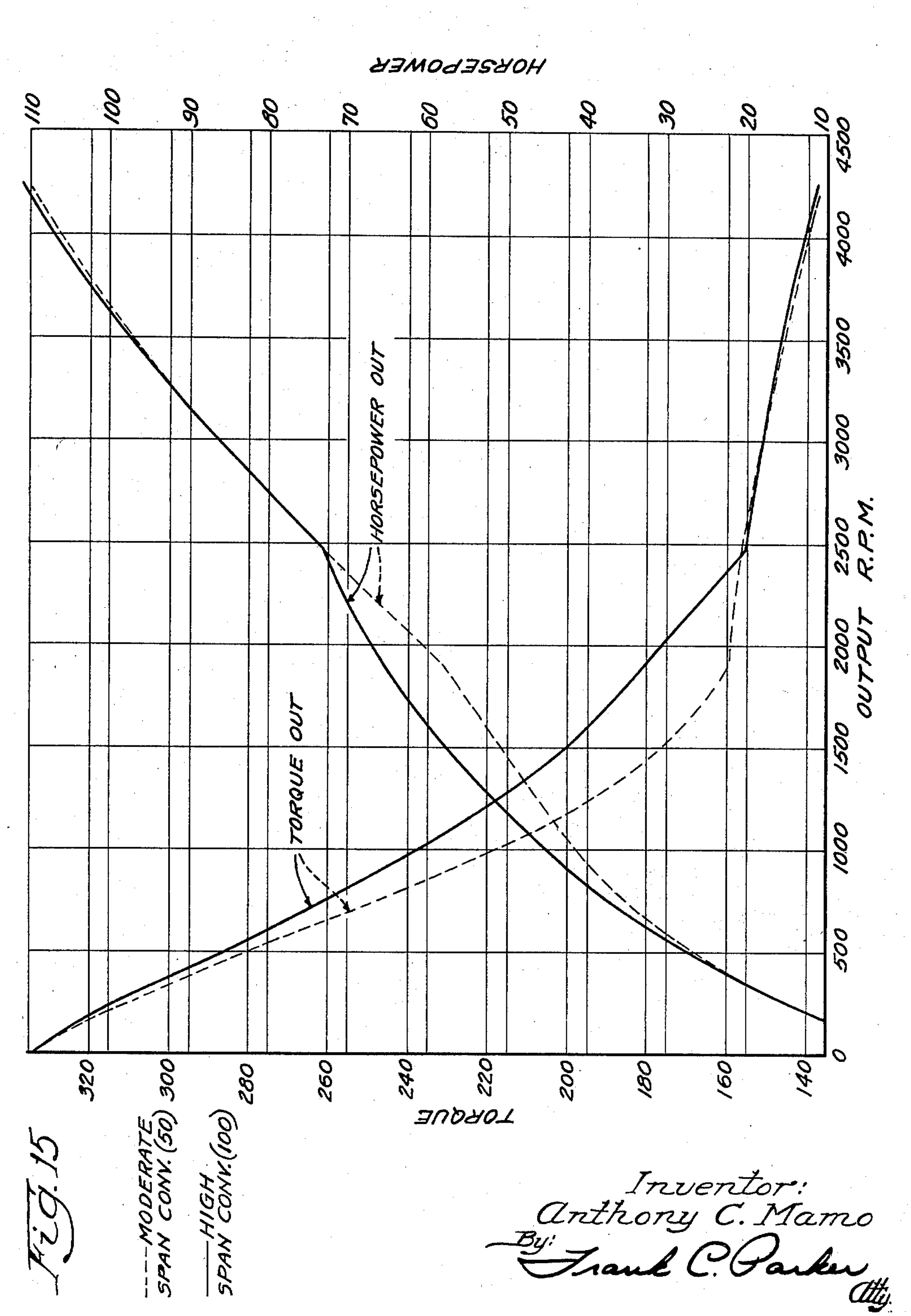
Figure 16:
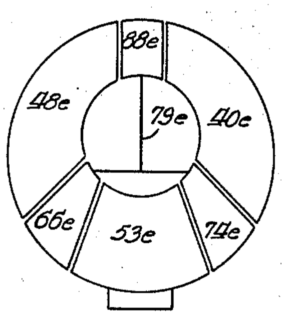
Figure 17:
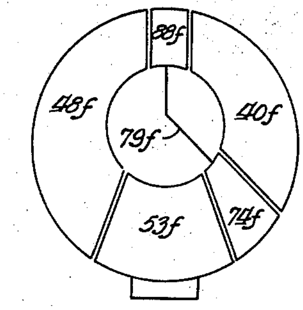
Figure 18:
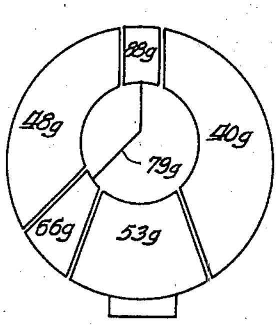
Figure 19:
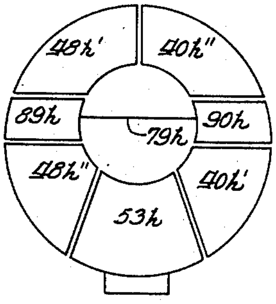
Figure 20:
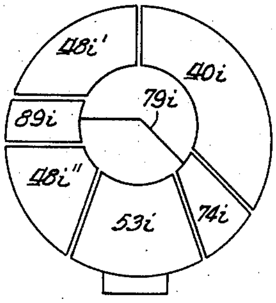
Figure 21:
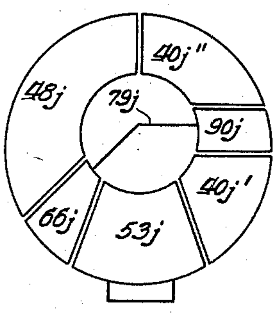
Figure 22:
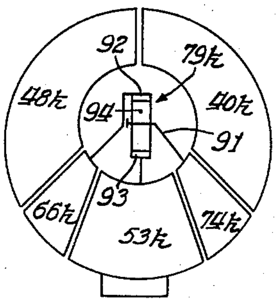
Figure 23:
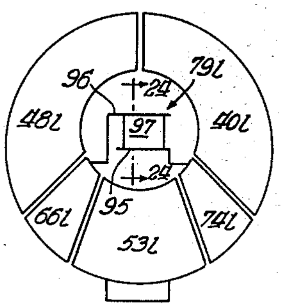
Figure 24:
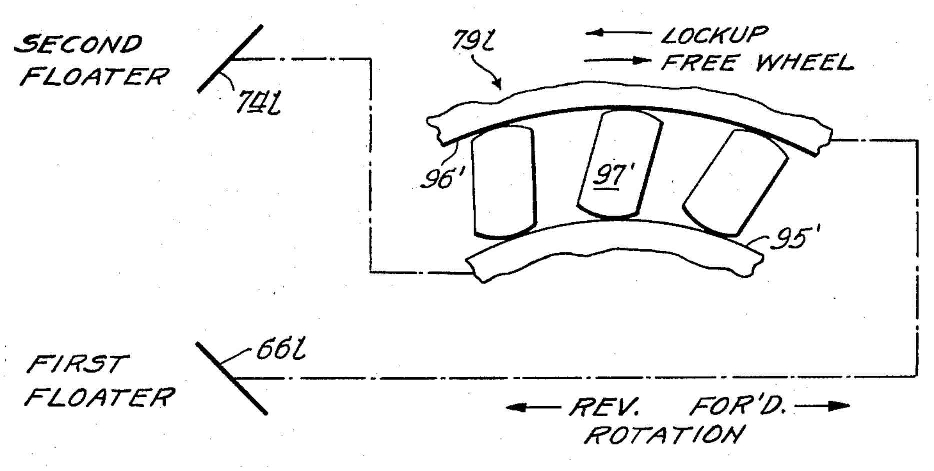
Figure 25:
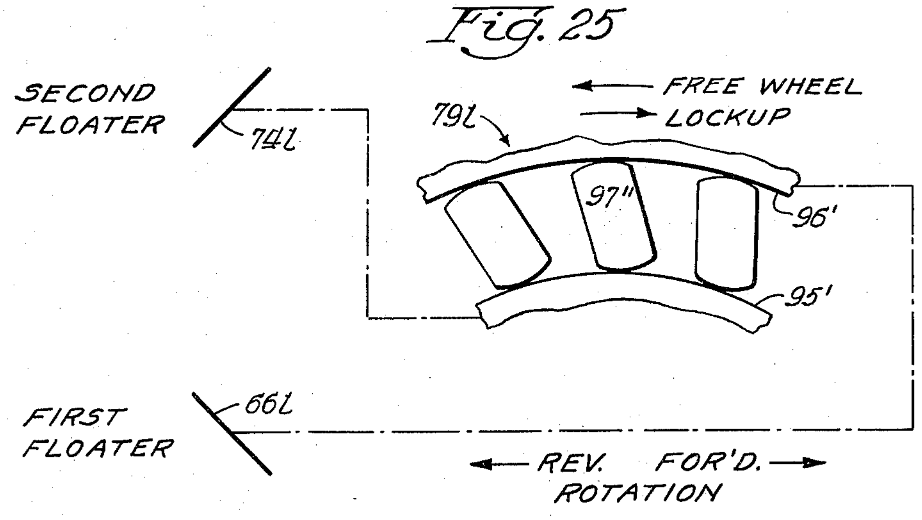
Figure 26:
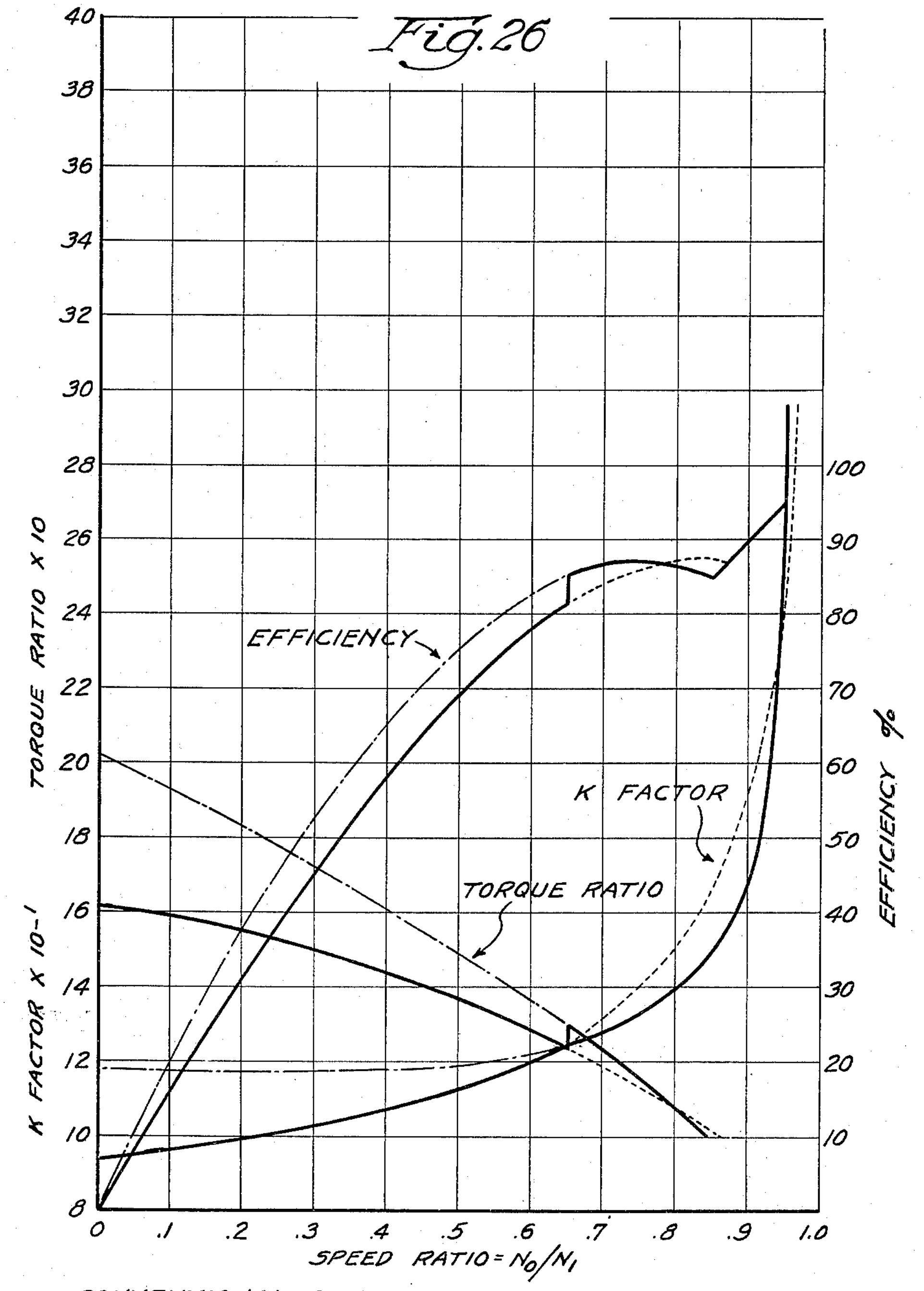
Figure 27:
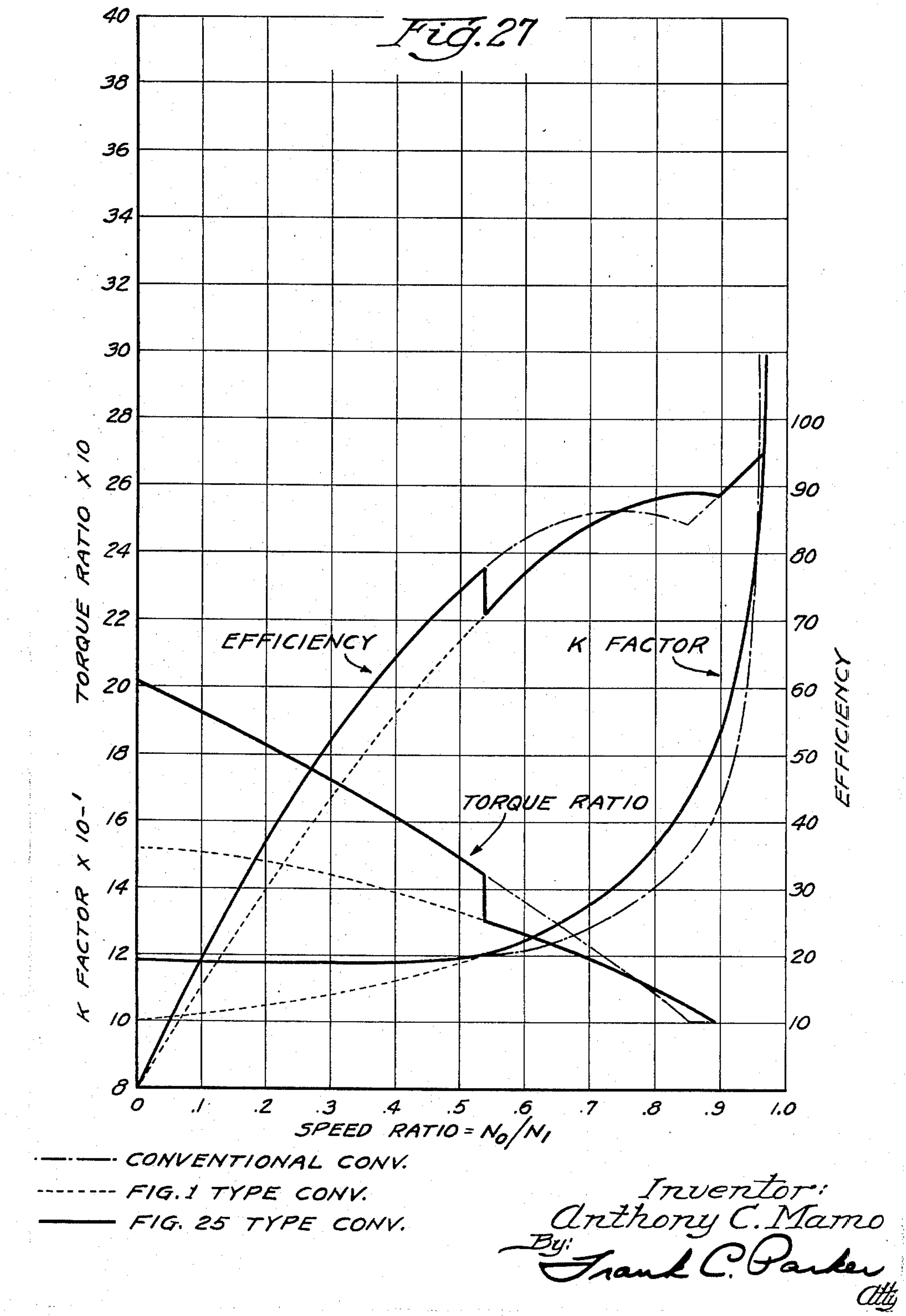

Fig. 11 is a diagram illustrating fluid flow during stall conditions and approximately at the clutch point in a hydraulic torque converter of the general type disclosed in Figs. 1–5 but having the first floater vanes disposed at substantially the same inclination as the direction of flow of the fluid leaving the turbine when the converter is operating at its clutch point and the second floater vanes inclined backwardly so as to impose substantial loading on the impeller throughout the entire range of operation of the converter;

Fig. 12 is a diagram illustrating fluid flow during stall conditions and approximately at the clutch point in a hydraulic torque converter of the general type disclosed in Figs. 1–5 but having the first floater vanes disposed at substantially the same inclination as the direction of flow of the fluid leaving the turbine during stall conditions and the second floater vanes inclined backwardly similar to the second floater vanes in Fig. 11;

Fig. 13 is a diagram graphically showing the performance of two different torque converters of the same diameter and having the same stall speeds and torque ratios and efficiencies throughout the entire torque conversion range, one having a span similar to that of a conventional converter without the floating elements and the other having a span similar to that of a converter of the type shown in Figs. 1–5;

Fig. 14 is a diagram of a typical automotive vehicle driving engine showing torque and the "K" factor plotted against engine speed;

Fig. 15 is a diagram showing the output torques and horsepowers plotted against output speed of two converters respectively having the characteristics shown in Fig. 13 when driven by an engine having the characteristics shown in Fig. 14;

Fig. 16 is a schematic view illustrating a modified form of torque converter incorporating the teachings of the present invention but having three different interconnected vaned floater members respectively disposed between the impeller and turbine, turbine and stator, and stator and impeller;

Fig. 17 is a schematic illustration of a modified form of torque converter having two rigidly interconnected vaned floater members disposed in toroidally spaced relation on opposite sides of the impeller;

Fig. 18 is a schematic illustration of a modified form of torque converter having two rigidly interconnected vaned floater members disposed in toroidally spaced relation on opposite sides of the turbine;

Fig. 19 is a schematic illustration of a modified form of torque converter having two rigidly interconnected vaned floater members respectively disposed between spaced portions of the converter impeller means and between spaced portions of the converter turbine means;

Fig. 20 is a schematic illustration of a modified torque converter having rigidly interconnected vaned floater members respectively disposed between the stator and impeller and between spaced portions of the converter turbine means;

Fig. 21 is a schematic illustration of a modified torque converter having the interconnected vaned floater members respectively disposed in toroidally spaced relation between the turbine and stator and between spaced portions of the converter impeller means;

Fig. 22 is a modified form of torque converter wherein the vaned floater members are respectively disposed in toroidally spaced relation on opposite sides of the stator and wherein the connecting means between the vaned floaters comprises a planetary gear set having a reaction member connected with the stator;

Fig. 23 is a schematic illustration of a torque converter of the general type disclosed herein wherein the vaned floater members are respectively disposd in toroidally spacd relation on opposite sides of the stator, and wherein the floater members are interconnected through the intermediary of a one-way clutch which permits the transmission of torque between the floater members when there is a tendency for one of the members to rotate in one relative direction of rotation with respect to the other and enables the floater members to free-wheel with respect to each other when there is a tendency for the one floater to rotate in the opposite relative direction of rotation with respect to the other;

Fig. 24 is a schematic fragmentary illustration taken along the line 24—24 in Fig. 23 and looking in the direction of the arrows and showing a one-way clutch suitable for use in the torque converter disclosed in Fig. 23 and so disposed that it will permit the floater elements to lock up whenever the first floater tends to rotate in a backward or counter-clockwise direction of rotation relative to the second floater or whenever the second floater tends to rotate in a forward or clockwise direction of rotation relative to the first floater;

Fig. 25 is a schematic fragmentary illustration similar to Fig. 24 and showing a one-way clutch adapted for use in the torque converter disclosed in Fig. 23 which permits the floater members to lock up and rotate in unison whenever the first floater tends to drive the second floater in a clockwise or forward direction of rotation or whenever the second floater tends to drive the first floater in a counterclockwise or backward direction of rotation;

Fig. 26 is a performance diagram of a hydraulic torque converter of the type shown in Fig. 23 wherein the one-way clutch interconnecting the floater members is disposed as shown in Fig. 24; and Fig. 27 is a performance diagram of a hydraulic torque converter of the type shown in Fig. 23 wherein the one-way clutch interconnecting the floater members is disposed as shown in Fig. 25.

With reference now to the drawings, wherein like reference numerals have been utilized in the different views to identify identical parts and wherein different letters have been added to the reference numerals to identify corresponding parts in modified forms of the invention, one preferred embodiment of the present invention, as disclosed in Figs. 1–5 will first be described.

Figure 1:
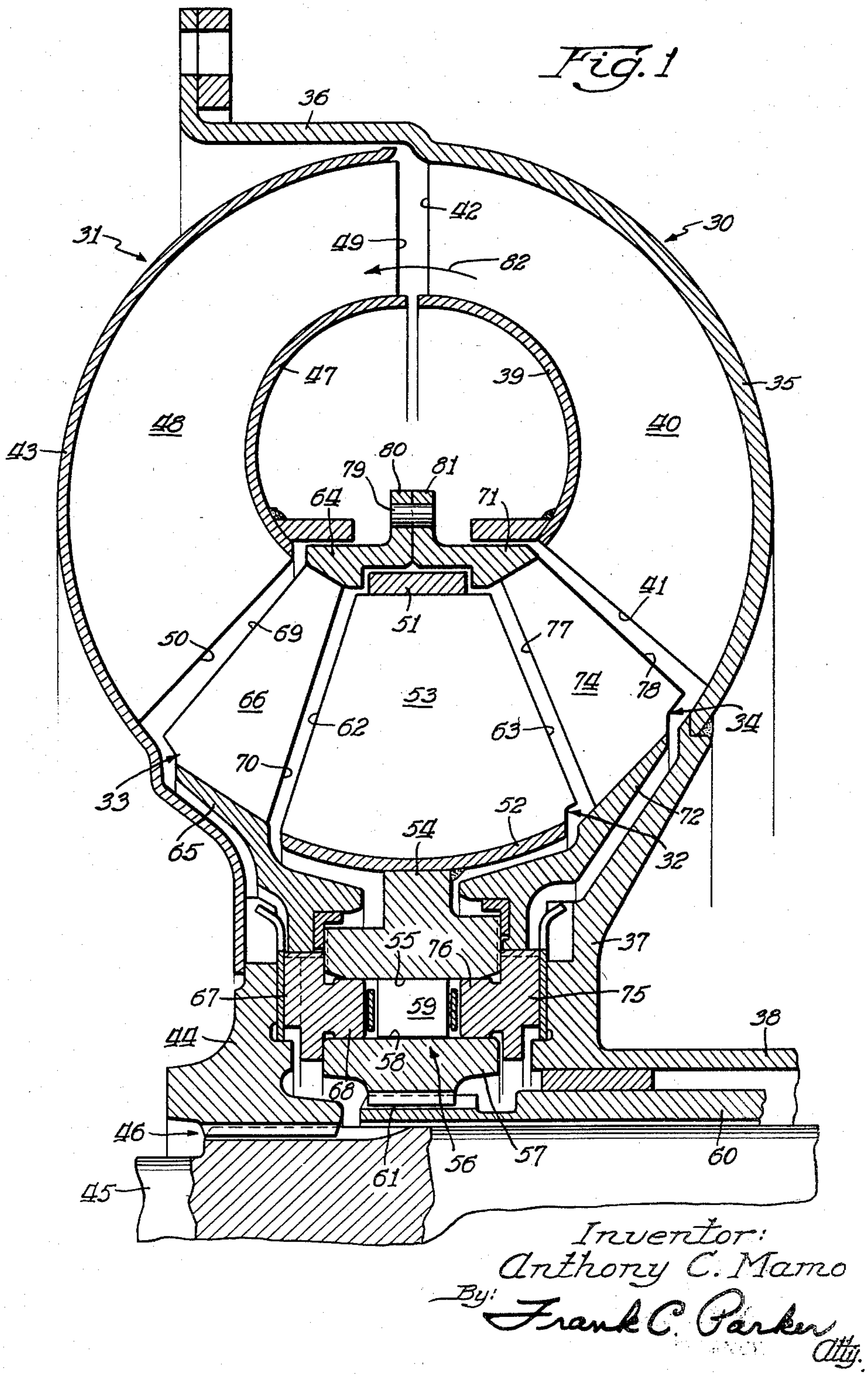
Fig. 1 is a sectional view through the upper half of one preferred form of hydraulic torque converter constructed in accordance with the principles of the present invention.

With particular reference to Fig. 1, the hydraulic torque converter disclosed therein comprises, in general, an impeller 30, a turbine 31, a stator 32, a first floater member 33 and a second floater member 34.

The impeller 30 comprises an outer annular shell 35 having a forwardly projecting flange portion 36 adapted to be connected in any desired manner to a driving engine or motor, and the outer shell 35 is suitably secured, as by welding, to a generally radially outwardly extending flange 37 formed on the forward end of a rotatably mounted sleeve shaft 38. The impeller 30 also comprises an annular inner shell 39 which, together with the outer shell 35, rigidly supports a plurality of impeller vanes 40. The configuration or angle of inclination of the impeller vanes 40 is exemplified in Figs. 2–5. Each of the impeller vanes 40 has an entrance 41 and an exit 42. As is clearly illustrated in Figs. 2–5, each of the impeller vanes 40 slopes or slants slightly rearwardly or reversely from its entrance 41 to its exit 42.

The turbine 31 comprises an outer shell 43 which is rigidly secured to a hub 44 suitably splined on a shaft 45, as indicated generally at 46. The shaft 45 is mounted concentrically with respect to the sleeve shaft 38 so as to maintain concentric alignment between the impeller 30 and turbine 31. The turbine 31 also comprises an inner shell 47 which, together with the outer shell 43, supports a plurality of turbine vanes 48. Each of the turbine vanes 48 has an entrance 49 and an exit 50 and it will be noted, particularly from Figs. 2–5, that each of the turbine blades 48, when proceeding from the entrance 49 to the exit 50, is curved, sloping or slanting generally in a forward direction near the entrance 49 and slanting in a backwardly or reverse direction near the fluid exit 50. It will be understood that fluid leaving the impeller vanes 40 through the exits 42 thereof enters the turbine 31 through the entrances 49 of the turbine blades 48.

The stator 32 comprises a shell 51 and a shell 52 which together suitably support a plurality of stator vanes 53. The shell 52 of the stator 32 is suitably secured, as by welding to a member 54 having an inwardly facing cylindrical surface 55 which comprises the outer race of a one-way engaging device 56. The one-way engaging device 56 also comprises an inner member 57 having an outwardly facing cylindrical surface 58 which forms the inner race of the one-way engaging device 56. The races 55 and 58 are concentrically disposed with respect to each other and are adapted to have a plurality of peripherally spaced tiltable sprags or eccentric gripping devices 59 disposed therebetween. The sprags 59 tilt about their individual axes in one direction to a released condition and thus enable the races 55 and 58 to rotate relatively with respect to each other. When the sprags 59 tilt in the opposite direction they are effective to lock up the two races. The inner member 57 is suitably splined to a sleeve shaft 60, as indicated at 61, with the shaft 60 being disposed concentrically between the shafts 45 and 38 and ordinarily secured to a stationary member. As a result, the stator 32 may rotate freely in a forward direction due to the action of the one-way engaging device 56 but whenever it tends to rotate reversely it is ordinarily held stationary.

Each of the stator vanes 53 has a fluid entrance 62 and a fluid exit 63 and the configuration of each of the stator blades 53 is as shown in Figs. 2–5. It will be noted that each stator blade 53 is slanted slightly reversely adjacent its entrance 62 and is slanted considerably forwardly at the fluid exit 63 and throughout a major portion of the surface of the blade 53.

The first floater member 33 is provided with a pair of shells 64 and 65 within which a plurality of first floater blades or vanes 66 are rigidly mounted. The external shell 65 is rotatably mounted on an annular member 67 which is provided with an axially extending portion 68 respectively disposed between the inner race 58 and outer race 55 of the one-way clutch 56. The portion 68 of the annular member 67 serves to hold the concentricity of the first floater member 33 with respect to the impeller 30, turbine 31 and stator 32. Each of the first floater member vanes 66 has an entrance 69 and an exit 70 respectively disposed adjacent the exits 50 of the turbine blades 48 and the entrances 62 of the stator blades 53.

The second floater member 34 comprises a pair of shells 71 and 72 for mounting a plurality of second floater vanes 74. The shell 72 is rotatably mounted on an annular member 75 which is formed with an axially extending portion 76 disposed respectively between the outer race 55 and the inner race 58 of the one-way engaging device 56. The axially extending portion 76 maintains the concentricity of the second floater member 34 with respect to the other vaned elements 30, 31, 32 and 33 of the torque converter. Each of the vanes 74 of the second floater member 34 is provided with an entrance 77 and an exit 78.

The floater members 33 and 34, in the embodiment of the invention disclosed in Figs. 1–5, are rigidly connected together by means of suitable pins 79 which extend through flanged portions 80 and 81 respectively formed on the shell 64 of the first floater member 33 and the shell 71 of the second floater member 34. In Figs. 2–5, the dot-dash line interconnecting the first floater blades 66 and the second floater blades 74 is designated by reference numeral 79 for purposes of convenience.

As has already been described, Figs. 2–5 are schematic diagrams illustrating fluid flow in the hydraulic torque converter during different conditions of operation. Briefly referring to Fig. 1, before discussing Figs. 2–5 in detail, it will be understood that the impeller 30 may be and is particularly designed to be driven by an automotive vehicle driving engine and the impeller vanes 40 cause the fluid disposed therebetween to move in a forward direction as indicated at the bottom of the page of each of Figs. 2–5. As is also clearly indicated on each of Figs. 2–5, the impeller vanes slope slightly backwardly or reversely from their entrance edges 41 to their exit edges 42. This causes the fluid disposed between the impeller vanes 40 to flow out from between the vanes past the exit edges 42 and into the spaces between the respective turbine vanes 48. This flow of fluid from the impeller vanes 40 is in a toroidal path, as indicated by reference arrow 82 in Fig. 1, as will be understood. The fluid progressively flows in its toroidal path from the impeller 30, which imparts kinetic energy to the fluid, into the turbine 31 which absorbs kinetic energy from the fluid and in turn drives the output shaft 45, through the first floater member 33, through the stator member 32 which changes the direction of rotation of the fluid to a forward direction and thence through the second floater member 34 and back into the impeller member 30.

It will be understood that in addition to the flow components of the fluid in a toroidal direction as indicated by arrow 82, the fluid also has either a forward or reverse rotational component of flow as indicated by the horizontal vectors respectively shown in Figs. 2–5. The absolute velocity of the fluid respectively leaving the different torque converter vaned elements 30, 31, 32, 33 and 34 is respectively designated by the diagonally directed vectors in Figs. 2–5.

Specific reference will now be made to Fig. 2 of the drawings which discloses the flow conditions prevailing in the torque converter disclosed in Fig. 1 while the stall condition of operation of the converter prevails. During stall, the automotive vehicle is stationary and, as a result, the turbine 31 and all of the turbine vanes 48 are stationary. The reaction on the stator 32 is in a reverse direction and the one-way engaging device 56 holds the stator vanes 53 stationary. During the stall condition, torque is delivered to the impeller vanes 40 by the vehicle driving engine and the impeller functions as the driving element of the converter.

Thus, during stall, the vehicle driving engine rotates the impeller vanes 40 in a forward direction (to the right in Figs. 2–5) as indicated by the arrows at the bottom of each of these figures. The slight reverse slope of the impeller vanes 40 and the forward rotation of the impeller vanes 40 together cooperate to cause the fluid to simultaneously flow in a forward direction and in a toroidal direction. The absolute velocity of the fluid leaving the impeller vanes 40 during stall conditions of operation of the turbine is represented by the diagonal vector $Ivs$. The absolute velocity vector $Ivs$ is, of course, made up of two components, namely a rotational component which represents the angular momentum of the fluid and which is designated by vector $Ims$, and a toroidal component or flow component in a toroidal direction indicated by the vertical vector $Iqs$.

Brief consideration should be given to the slight losses in angular momentum and absolute velocity which occur in any torque converter during operation thereof. In Fig. 2, the vector $Ims$ represents the forward angular momentum which would be imparted to the fluid as it leaves the impeller vanes 40 if the fluid actually left the impeller vanes in the same direction as the physical exit angle of the impeller vanes, as represented by the solid line *a*. Due, however, to the fact that the impeller vanes 40 rotate forwardly, the pressure on the forward sides or faces thereof is slightly greater than the pressure on the reverse sides or faces of the impeller vanes. Thus, as the fluid leaves the impeller exits 42 it deviates slightly reversely from the direction indicated by line *a* to some direction such as is represented by the dotted line *b*. The effect of this deviation is to reduce the actual angular momentum of the fluid leaving the impeller by some quantity designated by $\Delta m$. Likewise the absolute velocity is slightly different from that represented by vector I*vs* and actually is some value which could be represented by a vector drawn on dotted line *c*.

However, rather than unduly complicate the entire description, the vectors I*ms* and I*vs* will be used to respectively designate the corrected angular momentum and absolute velocity of the fluid leaving the impeller, taking into account the loss in angular momentum $\Delta m$ and the loss in absolute velocity because of $\Delta m$. Similarly, the absolutely velocity and angular momentum vectors for the fluid leaving the other converter elements take into account these corrections necessary because of such losses.

The fluid leaving the impeller vanes 40 with an absolute velocity designated by vector I*vs* enters the turbine 31, thereby impinging against the reverse or leftwardly facing sides (as viewed in Fig. 2) of the turbine vanes 48. It will be recalled that during stall conditions of operation of the converter, the turbine vanes 48 are stationary and thus the fluid leaving the impeller vanes is redirected in a reverse direction substantially equal to the slope of the turbine vanes 48 at the exits 50 thereof. The absolute velocity of the fluid leaving the turbine vanes 48 during the stall condition of operation of the converter is represented by vector T*vs*. The absolute velocity vector T*vs* is, of course, made up of two components, namely a component representing the angular momentum of the fluid leaving the turbine vnaes 48 and designated by vector T*ms* and a toroidal or flow component T*as*.

During the stall condition of operation of the torque converter, the fluid leaving the turbine vanes 48 with an absolute velocity represented by vector T*vs*, enters the first floater member 33 and impinges against the forward sides of the first floater vanes 66. The two floater members 33 and 34 are directly connected together and they are free to rotate relative to the impeller, turbine and stator members. As is apparent from Fig. 2, the velocity vector T*vs* of the fluid entering the first floater member 33 is directed more reversely than the slope of the first floater vanes 66. Thus there is a tendency for the fluid entering the first floater 33 to cause the latter to tend to rotate in a reverse direction (to the left as viewed in Fig. 2). Due to the integral interconnection between the first floater 33 and the second floater 34 the second floater vanes 74 function somewhat as a brake on the rotation of the integral floaters 33 and 34 so that the first floater vanes 66 cannot rotate revserely in an unrestricted manner. This tendency of the first floater blades 66 to oppose the free flow of fluid from the turbine in a reverse direction causes a slight deflection of the fluid to a direction having a lesser reverse component than the direction of flow of the fluid as it leaves the turbine, or, to state it in another way, the first floater blades 66 tend to deflect the fluid slightly forwardly relative to its direction of flow upon leaving the turbine blades or vanes 48 during stall conditions.

The absolute velocity of the fluid leaving the first floater vanes 66 is represented by vector $F_1$*vs*. The absolute velocity vector $F_1$*vs*, of course, is equal to the sum of the angular momentum component represented by reversely directed vector $F_1$*ms* and $F_1$*qs* which represents the torodial flow of the fluid leaving the first floater vanes 66.

The stator 32, comprising the plurality of peripherally spaced vanes 53 is held against reverse rotation by the one-way engaging device 56 and thus the fluid entering the stator 32 impinges against the forward faces of the stator vanes 53 and leaves the stator in substantially the same direction as the slope of the stator blades at their exits 63. It will be borne in mind that the fluid entering the stator vanes and impinging against the forward faces thereof, tends to drive the stator vanes 53 in a reverse direction. Since the stator 32 is held stationary it acts as a reaction member and enables the hydraulic torque converter to multiply torque between the impeller vanes 40 and the turbine vanes 48.

The fluid leaves the stator under stall conditions of operation of the converter with an absolute velocity represented by vector S*vs*. The absolute velocity vector S*vs* comprises the sum of the angular momentum of the fluid leaving the stator represented by vector S*ms* and the flow component in a toroidal direction designated by vector S*qs*.

As stated above, the interconnected floater vanes 66 and 74 tend to be driven in a reverse direction due to the action of the fluid entering the first floater 33 and impinging against the forward faces of the first floater vanes 66. This slight reverse rotation of the second floater vanes 74 causes them to deflect the fluid leaving the stator slightly reversely. In other words, the forward component of the fluid leaving the stator is decreased by the combined effect of the two floater vanes 66 and 74.

The fluid leaving the second floater vanes 74 therefore leaves in a direction such that the absolute velocity of the fluid is represented by vector $F_2$*vs*. The absolute velocity vector $F_2$*vs* is, of course, equal to the sum of the angular momentum of the fluid leaving the second floater vanes 74 designated by vector $F_2$*ms* and the toroidal flow component designated by vector $F_2$*qs*.

Figure 2:
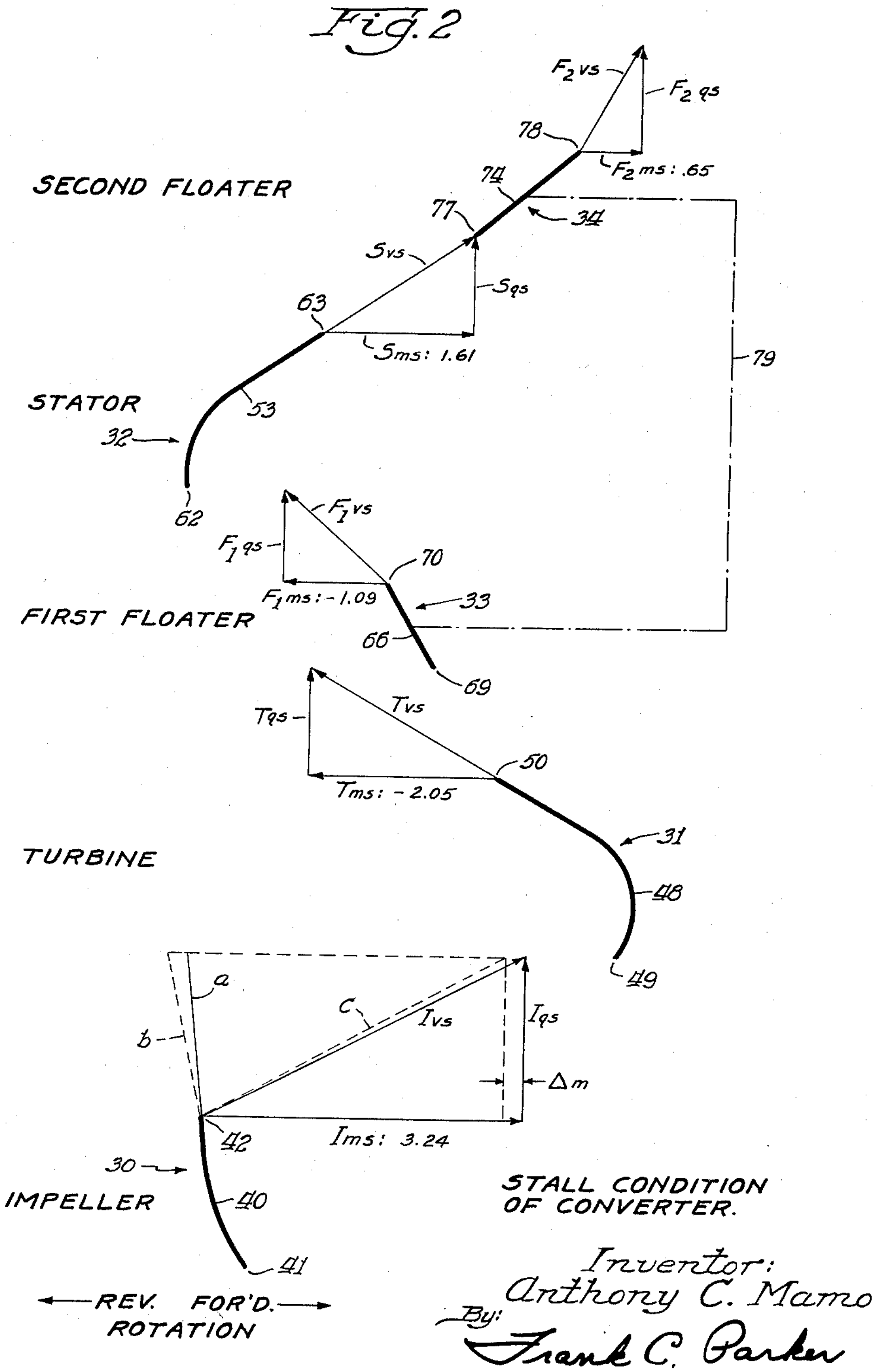
Fig. 2 is a diagram illustrating the directions of flow of the fluid in the torque converter shown in Fig. 1 during stall conditions of operation.

From the immediately foregoing discussion of Fig. 2, it is apparent that the first and second floater members 33 and 34 cooperate during the stall condition of operation of the torque converter to deflect the fluid leaving the stator vanes 53 in a reverse direction. The resultant effect on the torque converter caused by this operation of the floater vanes 66 and 74 is to increase the load on the impeller vanes 40. The significance of this is that it requires more torque from the driving engine in order to cause the impeller vanes 40 to impart a given absolute velocity to the fluid leaving the impeller vanes designated by vector I*vs* than would be required if the fluid entered the impeller vanes 40 in the direction of flow indicated by vector S*vs* which designates the absolute velocity of the fluid leaving the stator vanes 53.

As is well known, the torque handling capacity of a hydraulic torque converter is directly proportional to the difference between the angular momentum of the fluid leaving the impeller, designated by vector I*ms*, and the angular momentum of the fluid entering the impeller. If the hydraulic torque converter were constructed in the conventional manner without the first and second floaters 33 and 34, the angular momentum of the fluid entering the impeller vanes 40 would be very nearly equal to the angular momentum of the fluid leaving the stator vanes 53 and designated by vectors S*ms*. With the first and second floater members 33 and 34 disposed in the toroidal circuit, the angular momentum of the fluid entering the impeller vanes 40 is designated by the angular momentum of the fluid leaving the second floater vanes 74, which in this instance is represented by vector $F_2$*ms*. Inasmuch as vector $F_2$*ms* is substantially shorter than vector S*ms* it is apparent that the torque handling capacity of the hydraulic torque converter has been increased considerably by the addition of the first and second floater members 33 and 34. From a practical standpoint, this means that for any given impeller speed, when the hydraulic torque converter is provided with the floater members 33 and 34, it is capable of absorbing more torque under stall conditions than would be possible were not the first and second floater members 33 and 34 disposed in the toroidal circuit.

Figure 3:
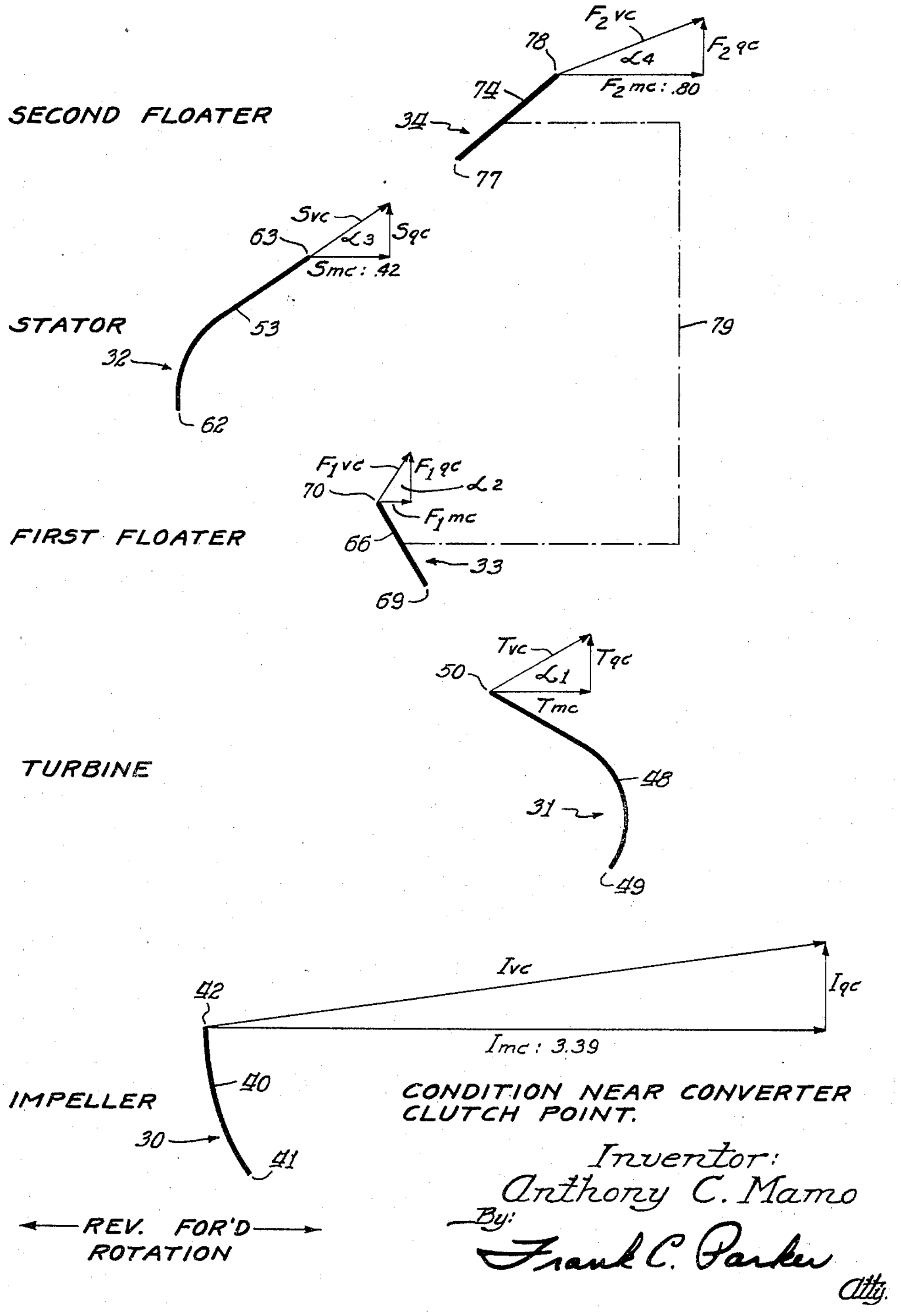
Fig. 3 is a diagram illustrating the directions of fluid flow in the torque converter when it is operating in the range just below the converter clutch point.

Reference should now be had to Fig. 3 which discloses the flow conditions prevailing in the hydraulic torque converter of Fig. 1 when the converter is operating very near to the converter clutch point. The conditions actually represented by Fig. 3 are those which occur at some point before the fluid enters the stator in the same direction as it leaves the stator. In other words, the conditions represented by Fig. 3 are those which exist when the fluid enters the stator with a slightly less forward component than the forward component of the fluid leaving the stator.

In order to better understand the following discussion of Fig. 3, it should be pointed out that the vectors shown in Fig. 2 have been approximately drawn to a first predetermined scale. In Fig. 3, which represents the conditions existing when the converter is operating near its clutch point, the vectors have been approximately drawn to a scale twice the size of the scale used in Fig. 2. This change in the scales between Figs. 2 and 3 has been used because of the fact that when the converter functions at high speed ratios between the turbine and impeller, toroidal fluid flow in the converter is substantially less than the toroidal fluid flow during stall conditions of operation. Accordingly, the lengths of the vectors in Fig. 3, if drawn to the same scale as the corresponding vectors in Fig. 2, would have been too short to clearly and accurately illustrate the magnitudes and directions of flow of the fluid.

Under the conditions of Fig. 3, the fluid leaves the impeller vanes 40 with an absolute velocity designated by vector I*vc*. The absolute velocity vector I*vc* is composed of a rotational component represented by the angular momentum of the fluid and designated by the vector I*mc* and a toroidal flow component designated by vector I*qc*.

During the conditions of Fig. 3 the speed ratio between the turbine and impeller will be of the order of .85, that is, for each revolution of the impeller the turbine will rotate approximately .85 revolutions. Thus, the turbine vanes 48 are rotating forwardly with substantial speed and the fluid leaves the turbine vanes 48 at an absolute velocity represented by vector T*vc*. The angular momentum of the fluid leaving the turbine vanes 48 is represented by vector T*mc* and the flow component in a toroidal direction of the fluid leaving the turbine 48 is represented by vector T*qc*.

During the conditions prevailing in Fig. 3, the fluid leaves the turbine in a forward direction such that it impinges upon the reverse sides of the first floater vanes 66. This tends to drive the floater vanes 66 in a forward direction and, as a result, the second floater vanes 74 function as a brake on the forward rotation of the interconnected floater vanes 74 and 66. Thus the first floater vanes 66 deflect the fluid leaving the turbine vanes slightly reversely. In other words, the direction of flow of the fluid leaving the first floater vanes 66 is less forwardly than the direction of flow of the fluid leaving the turbine vanes 48. The absolute velocity of the fluid leaving the first floater vanes is designated by vector $F_1vc$ which comprises a forward flow component designated by vector $F_1mc$ and a toroidal flow component designated by vector $F_1qc$.

Inasmuch as the direction of flow of the fluid leaving the first floater vanes 66, as represented by vector $F_1vc$, has a lesser forward component than the angle of inclination of the exit edges 63 of the stator vanes 53, the fluid leaving the first floater vanes 66 impinges against the forward sides of the stator vanes 53 which remain stationary and are effective to deflect the fluid more forwardly than the direction of flow of the fluid as it leaves the first floater. The absolute velocity of the fluid leaving the stator vanes 53 is represented by vector S*vc*, the vector S*vc* being made up of its component parts comprising the angular momentum of the fluid and represented by vector S*mc* and the flow component in a toroidal direction represented by vector S*qc*.

The direction of flow of the fluid leaving the stator, as represented by vector S*vc*, is but slightly more forward than the angle of inclination of the second floater 74. As stated heretofore, under the conditions prevailing in Fig. 3, the interconnected floater vanes 74 and 66 actually rotate in a forward direction. Therefore the fluid leaving the stator vanes 53 in the direction represented by absolute velocity vector S*vc*, impinges against the forward sides of the second floater vanes 74 which, in turn, deflect the fluid forwardly from the direction represented by vector S*vc*. The absolute velocity vector $F_2vc$, which represents the direction and velocity of the fluid leaving the second floater vane 74, is made up of the two components, namely the angular momentum component represented by vector $F_2mc$ and the flow component in a toroidal direction represented by vector $F_2qc$.

As is clearly apparent from Fig. 3, the direction of flow of the fluid leaving the second floater vanes 74, represented by vector $F_2vc$, has a substantially greater forward component than the direction of flow of the fluid leaving the stator vanes 53, as represented by vector S*vc*. This means that the impeller 30 is relatively unloaded and as a result of this fact, the impeller 30 and driving engine are allowed to speed up faster with the first and second floater members 33 and 34 disposed in the toroidal circuit than they would be able to speed up in the absence of these two members in the toroidal circuit. When the driving engine speeds up in this manner it is able to deliver more horsepower. This is due to the fact that when the floater members 33 and 34 are omitted from the toroidal circuit, the fluid enters the impeller at an angle represented by vector S*vc* whereas with the two floaters disposed in the toroidal circuit the fluid enters the impeller at an angle represented by vector $F_2vc$.

For purposes of simplifying the following discussion, the angle between the absolute velocity vector T*vc* and angular momentum vector T*mc* is represented by $\alpha_1$. $\alpha_1$ therefore designates the angle between the plane of rotation of the exit edge 50 of the turbine vanes 48 and the absolute direction of flow of the fluid leaving the turbine vanes 48 under the conditions prevailing in Fig. 3. $\alpha_1$ may thus be stated as being the flow angle of the fluid leaving the turbine during the conditions prevailing in Fig. 3. Correspondingly, $\alpha_2$ has been used to designate the angle between vectors $F_1vc$ and $F_1mc$ which may be considered as the flow angle of the fluid leaving the first floater vanes 66. $\alpha_3$ designates the angle of inclination of the physical exit edges 63 of the stator vanes 53 measured from the direction of forward rotation of the stator vanes 53. Likewise, since the stator vanes 53 are stationary during the conditions prevailing in Fig. 3, $\alpha_3$ also designates the angle of the fluid leaving the stator vanes 53. $\alpha_4$ designates the angle between the vectors $F_2vc$ and $F_2mc$ which represents the flow angle of the fluid leaving the exits 78 of the second floater vanes 74.

Close examination of Fig. 3 will reveal that the angle $\alpha_1$ is somewhat less than the angle $\alpha_3$. If the floater vanes 66 and 74 were not disposed in the toroidal circuit, the fluid leaving the turbine vanes 48 with a flow angle equal to $\alpha_1$ would impinge upon the reverse faces of the stator vanes 53. This would cause the stator vanes 53 to rotate forwardly and the converter would have reached its clutch point during which condition it would not be multiplying torque, but instead would be operating merely as a fluid coupling or a slipping clutch.

Due to the first and second floater members 33 and 34 being in the toroidal circuit, the two floater members mutually cooperate with each other in such a manner as will deflect the fluid slightly reversely after it leaves the turbine vanes 48 and prior to its entry into the stator 32. Examination of Fig. 3 reveals that $\alpha_2$, the flow angle of the fluid leaving the first floater vanes 66, is considerably greater than either $\alpha_1$, the flow angle of the fluid leaving the turbine vanes 48, or $\alpha_3$, the angle of inclination of the exit edges 63 of the stator vanes 53. Thus, even though the fluid leaves the turbine vanes 48 at the flow angle $\alpha_1$, the floater members 33 and 34 are capable of deflecting the fluid reversely so that it enters the stator vanes 53 at angle $\alpha_2$. This causes the fluid leaving the first floater to strike the forward faces of the stator vanes 53 and thereby tends to drive the stator reversely. Inasmuch as the one-way engaging device 56 prevents this reverse rotation of the stator 32, the torque converter will be actually multiplying torque even though the fluid leaves the turbine at a flow angle less than the angle of inclination of the exit edges of the stator vanes 53. The significance of this latter fact is that the clutch point is extended, or the speed ratio at which the clutch point is reached is increased, by inserting the first and second floater members 33 and 34 in the hydraulic torque converter toroidal circuit and torque multiplication is correspondingly obtained over a greater range of speed ratios between the turbine and impeller.

Actually, in one particular operative embodiment of the torque converter disclosed in Fig. 1, it was found that the converter would multiply torque up to a speed ratio of approximately .9 between the turbine and impeller when the floating members 33 and 34 were disposed in the toroidal circuit whereas the torque converter was capable of multiplying torque only up to a speed ratio of approximately .85 between the turbine and impeller when the floating members 33 and 34 were omitted from the hydraulic torque converter toroidal circuit. It should be pointed out that the torque converter utilized in this comparison was a conventional hydraulic torque converter identical in all respects with hydraulic torque converters presently utilized on automotive vehicles. The converter shown in Fig. 1 comprised this same conventional converter with only the stator modified by an amount sufficient to enable the insertion of the floating members between the turbine and stator and between the stator and impeller. This stator modification did not change the entrance or exit angles but consisted only of machining off approximately ⅛″ from the entrance edge and ¹⁄₁₆″ from the exit edge of each stator vane.

Figure 4:
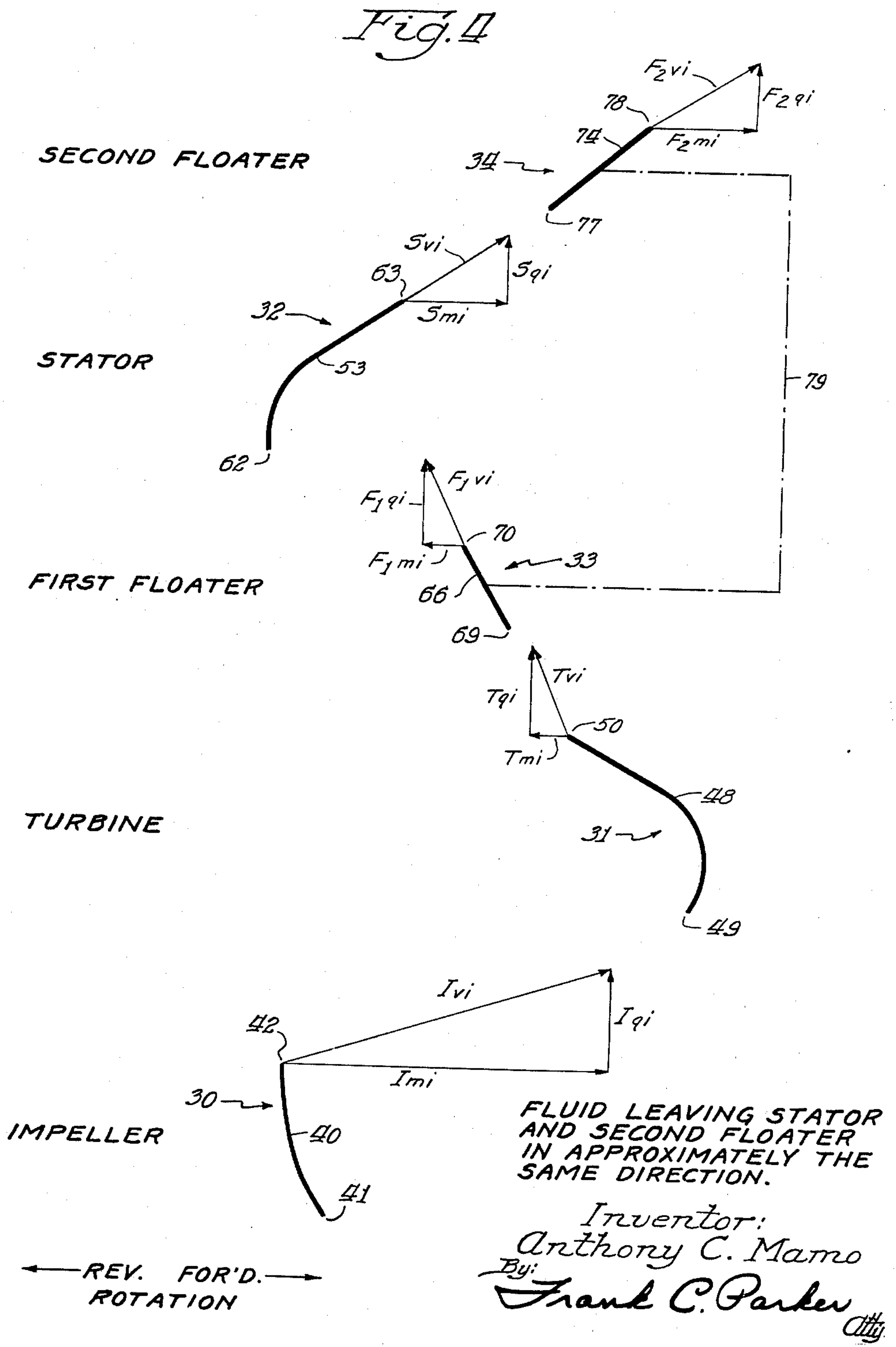
Fig. 4 is a diagram illustrating the directions of flow of the fluid in the torque converter under the conditions of operation when the fluid leaves the stator and the second floater in approximately the same direction, this condition prevailing at some point in the torque conversion range between stall and the clutch point.

Reference should now be made to Fig. 4, which illustrates the flow conditions in the torque converter disclosed in Fig. 1 at an intermediate point between the stall conditions represented in Fig. 2 and the conditions near the converter clutch point represented in Fig. 3. Specifically, Fig. 4 represents those conditions when the fluid leaves the stator vanes 53 and the second floater vanes 74 in substantially the same direction. While the turbine to impeller speed ratios progressively increase from zero, which is the speed ratio during stall conditions represented in Fig. 2, up to the speed ratio existing during the conditions represented in Fig. 4, the impeller may be said to be infinitely variably decreasingly loaded from a maximum loading at stall to zero loading under the conditions of Fig. 4. As the turbine to impeller speed ratios progressively increase from the speed ratio existing during the Fig. 4 operating conditions up the speed ratio occurring when the clutch point is reached, the impeller may be said to be infinitely variably increasingly unloaded from zero unloading to maximum unloading near the clutch point.

During the conditions of operation exemplified in Fig. 4, the first and second floater members 33 and 34 mutually cooperate in such a manner that the fluid leaves the stator and enters the impeller in substantially the same direction. In other words, during the range of operation between the stall conditions, as exemplified by Fig. 2, and the conditions exemplified in Fig. 4, the interconnected floater members 33 and 34 variably deflect the fluid reversely from the direction of flow of the fluid as it leaves the stator vanes 53. During stall the floater members 33 and 34 effect maximum reverse deflection of the fluid leaving the stator vanes 53 and as the speed ratio between the turbine and impeller gradually increases until the conditions of Fig. 4 prevail, the reverse deflection of the fluid leaving the stator and prior to its entry into the impeller is infinitely varied to a lesser and lesser extent until the deflection of the fluid leaving the stator is nil. During the range of converter operation from the Fig. 4 conditions to the Fig. 3 conditions, when the converter is functioning near its clutch point, the combined effect of the floater members 33 and 34 causes infinitely variable deflection of the fluid leaving the stator vanes 53 in a forward direction from zero up to a near maximum when the clutch point is actually reached.

During the Fig. 4 conditions of operation, the fluid leaves the impeller vanes 40 with an absolute velocity designated by vector I*vi* which is made up of an angular momentum component in the forward direction represented by vector I*mi* and a toroidal flow component represented by vector I*qi*.

Figure 7:
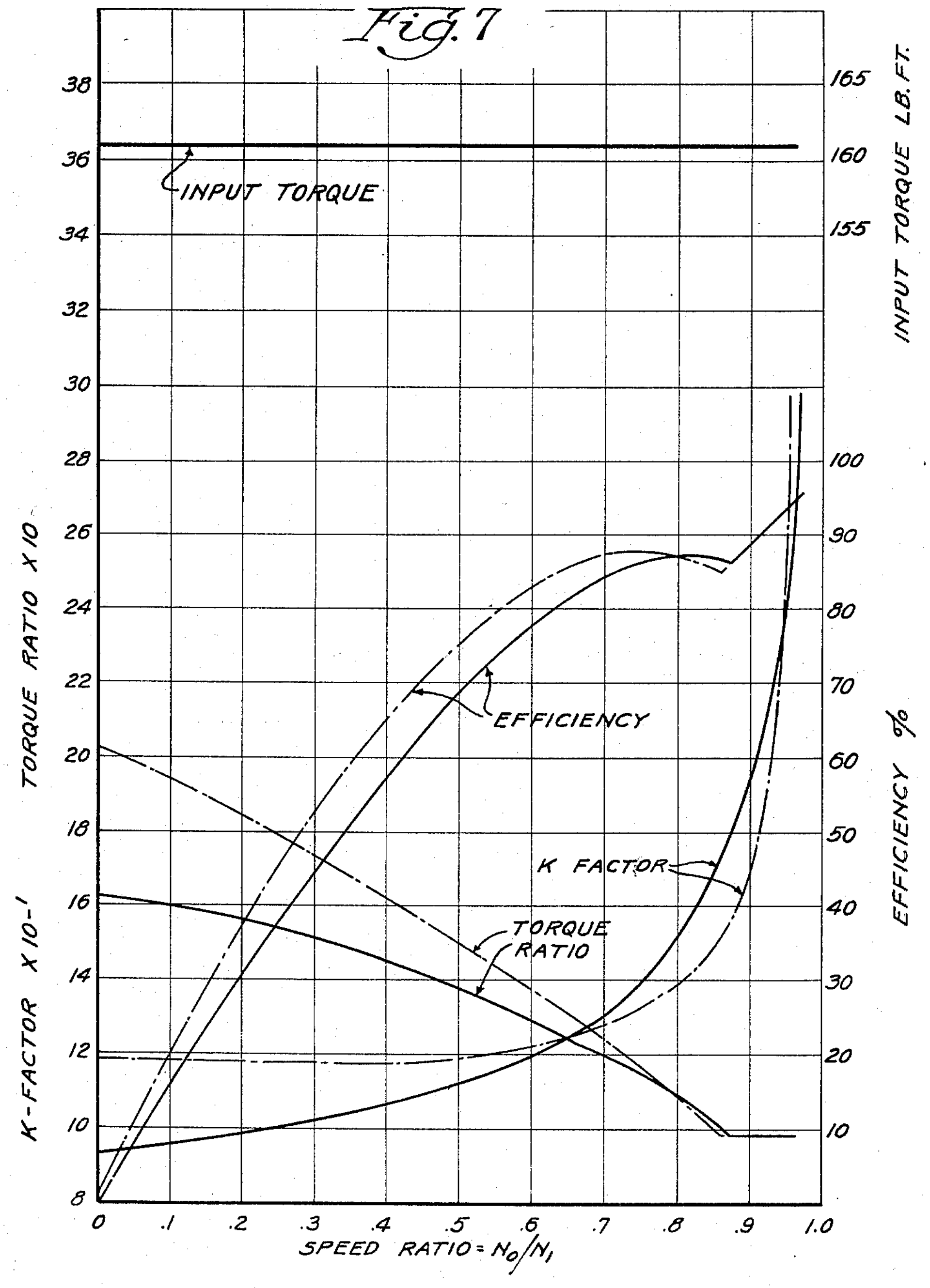

Under the conditions of operation of Fig. 4, the turbine is rotated forwardly at some intermediate speed ratio between zero and one-to-one prevails. This intermediate speed ratio, as is apparent from Fig. 7, is approximately .67. The fluid leaves the turbine vanes 48 with an absolute velocity designated by vector T*vi* made up of an angular momentum component designated by vector T*mi* and a toroidal flow component designated by vector T*qi*.

The direction of the vector T*vi* is slightly forward of the angle of inclination of the first floater vanes 66 and, therefore, the fluid entering the first floater member impinges against the reverse sides of the vanes 66 and thereby tends to drive the first floater member 33 in a forward direction at a relatively low speed. The interconnected second floater vanes 74, under these conditions, therefore act as a brake against the forward movement of the interconnected floater members 33 and 34 and, as a result, the fluid leaving the first floater is deflected slightly reversely with respect to its direction of entry into the first floater member 33. Thus, the fluid leaves the first floater vanes with an absolute velocity $F_1vi$ comprising an angular momentum component designated by vector $F_1mi$ and a toroidal flow component designated by vector $F_1qi$.

The fluid entering the stator vanes 53 impinges upon the forward faces thereof and therefore leaves the stator vanes in substantially the same direction as the angle of inclination of the stator vanes at their exit edges 63. The absolute velocity of the fluid leaving the stator vanes 53 under the conditions prevailing in Fig. 4 is designated by vector S*vi* which is made up of an angular momentum component S*mi* and a flow component in a toroidal direction designated by vector S*qi*.

Although the angle of inclination of the floater vanes 74 is very near to the angle of inclination of the exit edges of the stator vanes 63, there is a slight difference between these two angles and actually the second floater vanes are sloped or inclined slightly rearwardly or reversely of the exit edges 63 of the stator vanes 53.

As stated above, the fluid which impinges upon the reverse faces of the first floater vanes 66 tends to drive the interconnected floaters in a forward direction at a relatively low speed. The combination of the slight backward inclination of the second floater vanes 74 relative to the direction of flow of the fluid leaving the stator and the slight forward rotation of the second floater vanes 74 causes the fluid to leave the second floater vanes 74 in the same or substantially the same direction as the fluid leaves the stator vanes 53 during the conditions prevailing in Fig. 4. The absolute velocity of the fluid leaving the second floater vanes 74 is designated by vector $F_2vi$ which is made up of an angular momentum component $F_2mi$ and a flow component in a toroidal direction designated by vector $F_2qi$.

Figure 5:
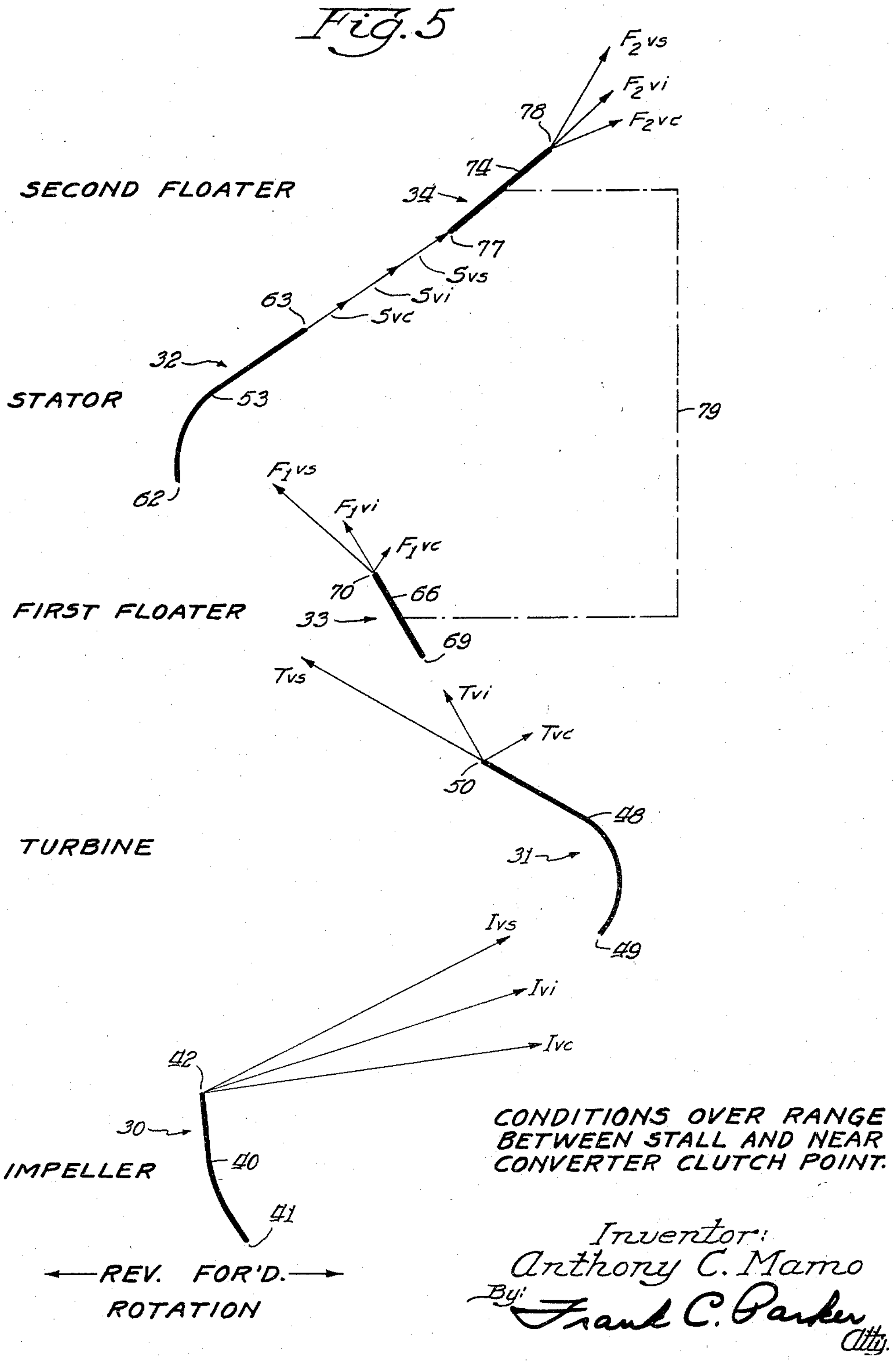
Fig. 5 is a diagram illustrating fluid flow in the torque converter over substantially the entire torque conversion range and illustrates the differences in directions of fluid flow during the different conditions of operation within the torque conversion range shown in Figs. 2, 3 and 4.

In Fig. 5, only the absolute velocity vectors have been shown for the fluid as it leaves the respective vaned elements of the torque converter and all of these vectors have been drawn to approximately the same scale as was used in Figs. 2 and 4. Fig. 5, by showing the fluid velocity vectors for the stall condition of operation of the converter, the condition of operation near the clutch point and the condition of operation at some intermediate point between stall and the clutch point, illustrates how the fluid leaving each of the respective vaned torque converter elements is infinitely variable in its direction of flow and/or magnitude of flow over the entire torque conversion range.

Particularly referring to Fig. 5, the absolute velocity of the fluid leaving the exit edges 42 of the impeller vanes 40 is infinitely variable over the torque conversion range between an absolute velocity designated by vector I*vs* at stall and an absolute velocity designated by I*vc* near the converter clutch point.

The absolute velocity of the fluid leaving the exit edges 50 of the turbine vanes 48 is infinitely variable over the torque conversion range between absolute velocity vectors T*vs* and T*vc* which correspond respectively to the velocity of the fluid when leaving the turbine during stall and at or near the clutch point of the converter.

Similarly, the absolute velocity of the fluid leaving the exit edges 70 of the first floater vanes 66 and the exit edges 78 of the second floater vanes 74 is likewise infinitely variable over the torque conversion range between the flow vectors designating the absolute velocity of the fluid leaving these members respectively during stall conditions of operation and the conditions of operation near the converter clutch point.

The direction of flow of the fluid leaving the stator is substantially constant throughout the torque conversion range, however, due to the decreased toroidal flow with increasing speed ratios, the magnitude of flow of the fluid leaving the stator vanes 53 is infinitely variable between a maximum at stall, represented by vector S*vs*, and a minimum at the clutch point, represented approximately by vector S*vc*.

A comparison of vectors $F_2vs$ and $F_2vc$ reveals that at stall the loading of the impeller 30 is at its maximum and the impeller 30 is infinitely variably and progressively increasingly unloaded as the turbine speed ratio increases and conditions of operation in the torque converter approach the clutch point at which the impeller unloading approaches a maximum.

For a more thorough understanding and appreciation of the advantages provided by the torque converter disclosed in Fig. 1, an actual quantitative comparison of a torque converter constructed as shown in Fig. 1 with a torque converter like the torque converter shown in Fig. 1 except that the stator vanes are very slightly shortened, as stated above, at their entrances and exits and the two floating members 33 and 34 are not present, will now be made.

In the following quantitative discussion, which refers to Figs. 2 and 3 particularly, the scaled lengths of the angular momentum vectors have been indicated. Inasmuch as the angular momentums designated by the vectors are not scalar quantities, they are merely proportional to the scaled vector lengths and therefore these angular momentum vectors have been designated as being proportional to the scaled lengths and not equal thereto. The symbol (:) has been used to signify (is proportional to) and therefore, for example, referring to Fig. 2, (*Ims*:3.24) would signify that the angular momentum of the impeller under stall conditions is proportional to 3.24.

One of the principal advantages of the torque converter disclosed in Fig. 1 over a conventional torque converter not provided with the floating members 33 and 34 arises from the increased capacity of the torque converter disclosed herein to handle torque without substantially structurally modifying the impeller, turbine or stator in any way.

For a torque converter of any type it can be stated that its torque capacity or torque handling capacity is proportional to the angular momentum of the fluid leaving the impeller minus the angular momentum of the fluid entering the impeller. For a conventional converter not provided with the two floating members 33 and 34, the torque handling capacity would therefore be proportional to the angular momentum of the fluid leaving the impeller minus the angular momentum of the fluid leaving the stator. This can be written in equation form as $$\text{Torque capacity } (n) = Im - Sm$$

where (*n*) designates the conventional hydraulic torque converter without the floater members, I*m* designates the angular momentum of the fluid leaving the impeller and S*m* designates the angular momentum of the fluid leaving the stator.

Therefore, as is apparent from Fig. 2, during the stall condition of operation, and for a given impeller speed, the torque capacity of a conventional hydraulic torque converter would be proportional to the difference between the finite lengths of vectors I*ms* and S*ms*. In the present instance, therefore, with the conventional torque converter not having the floating elements 33 and 34 disposed in the toroidal circuit, at stall conditions $$\text{Stall torque capacity } (n) = Ims - Sms{:}3.24 - 1.61 = 1.63$$

Now considering the torque handling capacity of the hydraulic torque converter disclosed in Fig. 1, under stall conditions of operation, it can again be stated that the torque handling capacity is equal to the difference between the angular momentum of the fluid leaving the impeller and the angular momentum of the fluid entering the impeller. In the hydraulic torque converter disclosed in Fig. 1, the angular momentum of the fluid leaving the impeller would be the same as that for the conventional torque converter and at stall would be proportional to 3.24. However, the angular momentum of the fluid entering the impeller is no longer the angular momentum of the fluid leaving the stator but, rather, is the angular momentum of the fluid leaving the second floater member which is represented by vector $F_2ms$ which has a finite value proportional to .65. Therefore, under stall conditions of operation the torque handling capacity of the hydraulic torque converter disclosed in Fig. 1 is as follows, where (*f*) designates the converter with the floating members in the toroidal circuit, $$\text{Stall torque capacity } (f) = Ims - F_2ms \text{ or } {:}3.24 - .65 = 2.59$$

It is therefore apparent that there is an actual gain in torque handling or absorbing capacity due to the insertion of the floating members in the toroidal circuit which may be set forth in equation form as follows:

$$\text{Stall torque capacity gain} = (Ims - F_2ms) - (Ims - Sms){:}(3.24 - .65) - (3.24 - 1.61){:}2.59 - 1.63 = .96$$

The percentage gain in torque handling capacity of the floating elements converter of Fig. 1 over the conventional converter may therefore be represented as:

$$\text{Percentage gain in stall torque capacity} = \frac{\text{Stall torque capacity } (f) - \text{Stall torque capacity } (n)}{\text{Stall torque capacity } (n)}$$

$$= \frac{(Ims - F_2ms) - (Ims - Sms)}{(Ims - Sms)}$$

$$= \frac{.96}{1.63} = 59\%$$

It has been stated heretofore in the present description that any energy taken in by one of the floating members must be given up by the other floating member. As a result of this fact, under all conditions of operation, the torque absorbed or given up by one of the floating members is equal and opposite to the torque given up or absorbed by the other floating member. Under stall conditions, the torque on the first floating vanes 66 is equal to the angular momentum of the fluid leaving the vanes 66 minus the angular momentum of the fluid entering the vanes 66, which, at stall, may be set forth as follows:

$$\text{Stall torque } (F_1) = F_1ms - Tms$$

or, in the present instance $$\text{Stall torque } (F_1): 1.09 - (-2.05) = -.96$$

It may likewise be stated that the torque on the second floating vanes 74 is equal to the angular momentum of the fluid leaving the vanes 74 minus the angular momentum of the fluid entering the vanes 74. At stall, this may be set up in equation form as follows, $$\text{Stall torque } (F_2) = F_2ms - Sms$$

or, in the present case $$\text{Stall torque } (F_2): .65 - 1.61 = -.96$$

The above, therefore, bears out the fact that the torque on the first floating member 33 is equal in magnitude and exactly opposite to the torque on the second floating member 34. This makes it clear that the energy absorbed by one of the floating members from the toroidal fluid circuit is given up to the fluid circuit by the other floating member. In order for the second floating member 34 to give up the energy absorbed from the fluid by the first floating member 33, it must deviate the fluid leaving the stator from the direction in which it is flowing upon leaving the stator.

The torque on the turbine vanes 48 is equal to the angular momentum of the fluid leaving the turbine vanes minus the angular momentum of the fluid entering the turbine vanes. Under stall conditions then with either the Fig. 1 converter or with the conventional converter, $$\text{Stall torque } (T) = Tms - Ims$$

or $$\text{Stall torque } (T): -2.05 - 3.24: -5.29$$

This shows that the stall torque on the turbine is the same with or without the floating elements in the toroidal circuit. It should be understood, however, that the turbine torque in both converters will be the same only if the toroidal flow is the same in both converters. In actual practice, when the floating elements 33 and 34 are omitted from the toroidal circuit, the toroidal flow drops by an amount substantially proportional to the difference in the torque capacities of the two different types of converters.

It has already been shown that the input torque at stall capable of being absorbed by the converter of Fig. 1 is proportional to the difference between vectors I*ms* and $F_2ms$, which difference has a finite value proportional to 2.59. The actual input torque absorbed by the Fig. 1 converter, at stall and measured in pound-feet, is therefore given by the following equation:

$$I(f)ts = \rho Q(Ims - F_2ms)C$$

where $\rho$ is the mass density of the fluid measured in slugs per cubit feet, Q is the total flow measured in cubic feet per second and C is a dimensionless factor which takes into account the scale to which the vectors in Fig. 2 have been drawn. By actual test, the finite values for the factors $\rho$, Q and C, in one operative embodiment are as follows:

$$\rho = \frac{1.55 \text{ lb. sec.}^2}{\text{ft.}^4}$$

$$Q = \frac{6.4 \text{ ft.}^3}{\text{sec.}}$$

$$C = 10$$

and, therefore, $$I(f)ts = \frac{1.55 \text{ lb. sec.}^2}{\text{ft.}^4} \times \frac{6.4 \text{ ft.}^3}{\text{sec.}} \times \frac{2.59 \text{ ft.}^2}{\text{sec.}} \times 10 = 258 \text{ lb. ft.}$$

If the flow were the same in a conventional torque converter (i.e. 6.4 cu ft./sec.) without the floating elements in the toroidal circuit, then the input torque absorbed by the conventiinal converter, at stall and measured in pound-feet would be, $$I(n)ts = \rho Q(Ims - Sms)C$$

and, therefore, $$I(n)ts = 1.55 \times 6.4 \times (3.24 - 1.61) \times 10 \text{ lb. ft.} = 161.7 \text{ lb. ft.}$$

Actual tests showed that the torque conversion ratio between the input torque absorbed by the impeller at stall and the output torque from the turbine, at stall, for the Fig. 1 converter is 1.62, and for the conventional converter without the floater members 33 and 34 is 2.02. Therefore the output torque from the Fig. 1 converter, at stall, is $$I(f)ts(\text{lb. ft.}) \times 1.62 = 258 \times 1.62 \text{ lb. ft.} = 416 \text{ lb. ft.}$$

and the output torque from the conventional converter without the floating members 33 and 34 in the toroidal circuit is $$I(n)ts(\text{lbs. ft.}) \times 2.02 = 161.7 \times 2.02 \text{ lb. ft.} = 327 \text{ lb. ft.}$$

It is therefore apparent that by adding the floating members 33 and 34 to the toroidal circuit, the output torque of the converter at stall is increased by 89 lb. ft. which is a percentage increase of 27.2%.

In the quantitative discussion of the conditions prevailing in Fig. 3, it was demonstrated how the clutch point (the point at which the torque ratio of the converter reaches 1:1 and the converter no longer multiplies torque) is reached at a higher turbine to impeller speed ratio in the converter disclosed in Fig. 1 than in a converter not having the floater elements 33 and 34 in the toroidal circuit.

The unloading effect on the impeller 30, due to the action of the interconnected floaters 33 and 34, has also been discussed from a qualitative standpoint. The unloading of the impeller 30 under conditions near the clutch point will now be discussed from a quantitative standpoint.

With particular reference to Fig. 3, which represents the flow conditions in the Fig. 1 type converter at a turbine to impeller speed ratio of approximately .85, the forward angular momentum of the fluid leaving the impeller vanes 40 is proportional to 3.39, and the forward angular momentum of the fluid leaving the second floater vanes 74 is proportional to .80. Thus, the torque on the impeller vanes 40 is proportional to $$Imc - F_2mc: 3.39 - .80 = 2.59$$

If the floater elements 33 and 34 are removed from the toroidal circuit, the torque on the impeller vanes 40 would be proportional to $$Imc - Sms: 3.39 - .42 = 2.97$$

Therefore, when the floater elements 33 and 34 are added to the toroidal circuit, the loading of the impeller vanes 40, under the conditions of Fig. 3, is decreased by an amount proportional to $$(Imc - Smc) - (Imc - F_2mc): 2.97 - 2.59 = .38$$

and the percent of unloading of the impeller vanes substantially at the clutch point, when the floaters are in the circuit is equal to $$\frac{(Imc-Smc)-(Imc-F_2mc)}{Imc-F_2mc}=\frac{2.97-2.59}{2.59}$$

$$=\frac{.38}{2.59}$$

$$=14.6\%$$

It will be recalled that, under the conditions of Fig. 3, the Fig. 1 converter is still multiplying torque and at the same time the impeller 30 is unloaded by 14.6%. This allows the impeller and driving engine to rotate at a higher speed and thus deliver more horsepower than the conventional converter without the floating elements 33 and 34.

The following description refers specifically to Fig. 7 of the drawings which is a performance diagram of the torque converter of Figs. 1–5. Also shown in Fig. 7 are the performance curves for the conventional torque converter, previously referred to, without the floating members 33 and 34 therein.

In Fig. 7 the solid lines designate the performance curves for the Fig. 1 type converter and the dot-dash lines are the performance curves for the conventional torque converter without the floating elements therein.

The performance curves plotted on Fig. 7 were obtained under constant input torque conditions. In other words, in the tests of both converters, the input torque was substantially constant throughout the tests and was approximately equal to 162 lb. ft. In this diagram it will be noted that the torque ratio at stall for the conventional converter, that is when the speed ratio is equal to zero for the conventional converter, is equal to 2.02 and for the Fig. 1 type converter the stall torque ratio is equal to 1.62. At the clutch point for the conventional converter, which occurs at a speed ratio approximately equal .85, the Fig. 1 type converter is still multiplying torque and continues to do so up to a speed ratio of approximately .87.

The K factor curves for each of the converters represented in Fig. 7 are curves designating the finite values of the input speed divided by the square root of the input torque. This may be stated in equation form as follows:

$$K=\frac{\text{Input speed}}{\sqrt{\text{Input torque}}}$$

Substituting the plotted values of K at stall from Fig. 7, in the above equation with an input torque of 162 lb. ft. it is apparent that with the Fig. 1 type converter the stall speed is approximately equal to 1189 r.p.m. and that the stall speed for the conventional converter is approximately 1498 r.p.m. Also from the above equation it is apparent that with the K factor equal to 93.5 (which is the value of K at stall with the Fig. 1 type converter) at stall, if the impeller were driven at 1498 r.p.m. (the stall speed of the conventional converter) the Fig. 1 type converter would be capable of absorbing 256.7 lb. ft. of torque. This substantially agrees with the stall torque capacity computed for the Fig. 1 type converter in the quantitative discussion of Fig. 2.

When the two converters diagrammed in Fig. 7 are compared at the same stall speed, namely 1498 r.p.m., the output torque at stall for the normal converter is equal to the input torque (162 lb. ft.) multiplied by the torque ratio (2.02) or 327 lb. ft. of torque deliverable to the vehicle driving wheels. With the Fig. 1 type converter operating at stall and at an input speed of 1498 r.p.m., the output torque deliverable to the vehicle driving wheels is equal to the input torque (256.7 lb. ft.) multiplied by the torque ratio (1.62), or 416 lb. ft. As is apparent, at stall, the floating element converter of Fig. 1 when driven at the same input speed as the conventional converter is capable of delivering 27.3% more torque to the vehicle driving wheels than is the conventional converter.

It will be noted that the K factor curve for the conventional converter is substantially flat from stall up to a speed ratio equal to approximately .5. From the .5 speed ratio up to the clutch point (speed ratio equal to approximately .85) the rate of rise in the K curve is relatively slight. This relatively slight rise in the K curve over the torque conversion range, that is, from stall up to the clutch point of the conventional converter simply means that there is but a slight change in the input or impeller speed between the stall condition and the clutch point.

It will be recalled that the tests exemplified in Fig. 7 were conducted at a constant input torque. As a result, the value of K is a linear function of the impeller speed throughout the entire torque conversion range and the value of K at any point is directly proportional to impeller speed. It is therefore apparent that with the relatively flat K surve of the conventional converter, the clutch point is reached and torque multiplication ceases at a relatively low vehicle speed, as the latter is equal to the impeller speed multiplied by the speed ratio.

With the modified torque converter shown in Fig. 1 it will be noted that the K curve exhibits a substantially greater rate of rise throughout the entire torque conversion range and this indicates that the torque converter of Fig. 1 is capable of multiplying torque up to a substantially greater vehicle speed, as well as impeller speed, than the conventional converter.

To quantitatively illustrate the foregoing statement, it will be assumed that both converters are operating at a speed ratio of .85. At this speed ratio the value of K for the conventional converter is approximately 152 and therefore the input speed is approximately 1930 r.p.m. This input speed is the speed of the impeller and since the speed ratio is .85, the output speed (turbine speed) is approximately 1640 r.p.m. With a conventional axle ratio this would give a vehicle speed of the order of 37 r.p.m. Under these conditions the conventional converter is operating at its clutch point and the torque delivered to the vehicle driving wheels is substantially the same as the input torque received by the impeller from the driving engine.

Now considering the Fig. 1 type converter at the speed ratio of .85, it will be noted from Fig. 7 that the value of K is approximately 171. Thus the input or impeller speed is approximately 2170 r.p.m. Since the speed ratio is .85 at this time, the turbine speed is approximately 1840 r.p.m. With the same axle ratio as was considered above in connection with the conventional converter the vehicle speed would be approximately 41.5 m.p.h.

The rise in vehicle speed of the Fig. 1 type converter at the same speed ratio (.85) is of the order of 4.5 m.p.h. and this may appear to be insignificant. Such is not the case, however, as it must be borne in mind that while the speed ratio of the two converters is the same, the vehicle road speed is actually approximately 10% greater with the Fig. 1 type converter than with the conventional type converter. Further, at the speed ratio of .85, the Fig. 1 type converter has not yet reached its clutch point and is still multiplying torque. Examination of Fig. 7 will reveal that the torque ratio of the Fig. 1 type converter at the speed ratio of approximately .85 is of the order of 1.02 and as a result, there is a multiplication of torque taking place and the actual output torque is 162×1.02 or approximately 165 lb. ft.

A more enlightening comparison of the two converters represented in Fig. 7 can be made by considering output speeds and engine speeds at the clutch point of each converter. These conditions, of course, have already been considered for the conventional converter and during these conditions the engine speed was shown to be 1930 r.p.m. and the turbine speed to be approximately 1640 r.p.m. At the clutch point of the Fig. 1 type converter, Fig. 7 shows that the speed ratio is .87. At this speed ratio the value of K is approximately 176. The input or impeller speed at the clutch point of the Fig. 1 type converter is therefore approximately 2230 r.p.m. and the turbine speed approximately 1950 r.p.m. With the same axle ratio as was considered above, the vehicle speed at the clutch point for the Fig. 1 type converter is approximately 43.5 m.p.h.

It is therefore apparent that with the Fig. 1 type converter, torque conversion has not only been extended over a greater range of speed ratios but, perhaps which is of even greater significance, the Fig. 1 type converter is capable of multiplying torque up to a vehicle speed of approximately 43.5 m.p.h., which is approximately 6.5 m.p.h. or 17.5% higher than for the conventional converter.

Further examination of Fig. 7 reveals that the efficiency curve for the conventional converter is above the efficiency curve for the Fig. 1 type converter from stall up to approximately .79 speed ratio. As a practical matter this is not too significant when it is considered that the torque converters on an average are operating in the range of speed ratios from zero to .79 somewhat less than 5% of the time. The ordinary automotive vehicle operates in the range of speed ratios above a value of .8, between 95 and 97% of the time and, as is apparent, within this range the efficiency curve for the Fig. 1 type converter is slightly above the efficiency curve for the conventional converter.

It will be noted from Fig. 7 that the upper ends of the K curves for both types of converters asymptotically approach the vertical line designating a speed ratio of one-to-one. The K curve for the Fig. 1 type converter, in the range where both of these curves asymptotically approach the vertical, is further to the right than the K curve for the conventional converter. The significance of this fact is that in the Fig. 1 type converter the impeller is capable of rotating at higher speeds and this enables the engine to rotate faster and thereby generate more horsepower than when the engine drives a conventional converter.

The term "span" is conventionally used in connection with torque converters to designate the difference between the value of K at the clutch point and at stall. Thus, the greater the span the more rapidly the K curve rises within the torque conversion range, whereas a small span designates a flatter K curve within the torque conversion range.

The span for the Fig. 1 type converter, designated in Fig. 7 is equal to the value of K at the clutch point (176) minus the value of K at stall (93.5) or approximately (82.5) whereas the span of the conventional converter designated in Fig. 7 is equal to the value of K at the clutch point (152) minus the value of K at stall (118) or approximately (34). This means that the span of the Fig. 1 type converter is approximately 140% greater than the span of the conventional converter.

It will be recalled that the floating members 33 and 34 were said to be cooperable to infinitely variably load the impeller 30 throughout the torque conversion range, and further that this loading, with the Fig. 1–5 converter, is at a maximum at stall and is at a minimum, or to put it another way the unloading is at a maximum, near the clutch point. The effect of loading the impeller is to decrease or depress the value of K, due to the fact that the loading tends to slow down the impeller. The effect of unloading the impeller, on the other hand, is to raise the value of K as it makes it possible for the impeller speed to increase. By allowing the impeller to be increasingly unloaded with increasing speeds of rotation thereof, the output speed of the driving engine can increase more rapidly and this enables the delivery of more horsepower to the load with increasing vehicle speeds.

It has been shown how the performance of the Fig. 1 type converter is substantially improved over the performance of a conventional converter, particularly in the range of operation in the vicinity of the clutch point. The particular torque converter tested, the results of which are shown on Fig. 7, had flat blades substantially shown in Figs. 2–5. In an effort to obtain still better performance at the upper end of the torque conversion range near the clutch point, in one operative embodiment of the Fig. 1 converter, the floater vanes 66 and 74 were bent slightly in order to streamline them somewhat and the performance of this modified converter is shown in the diagram of Fig. 6 as compared with the same conventional converter plotted in Fig. 7.

Figure 6:
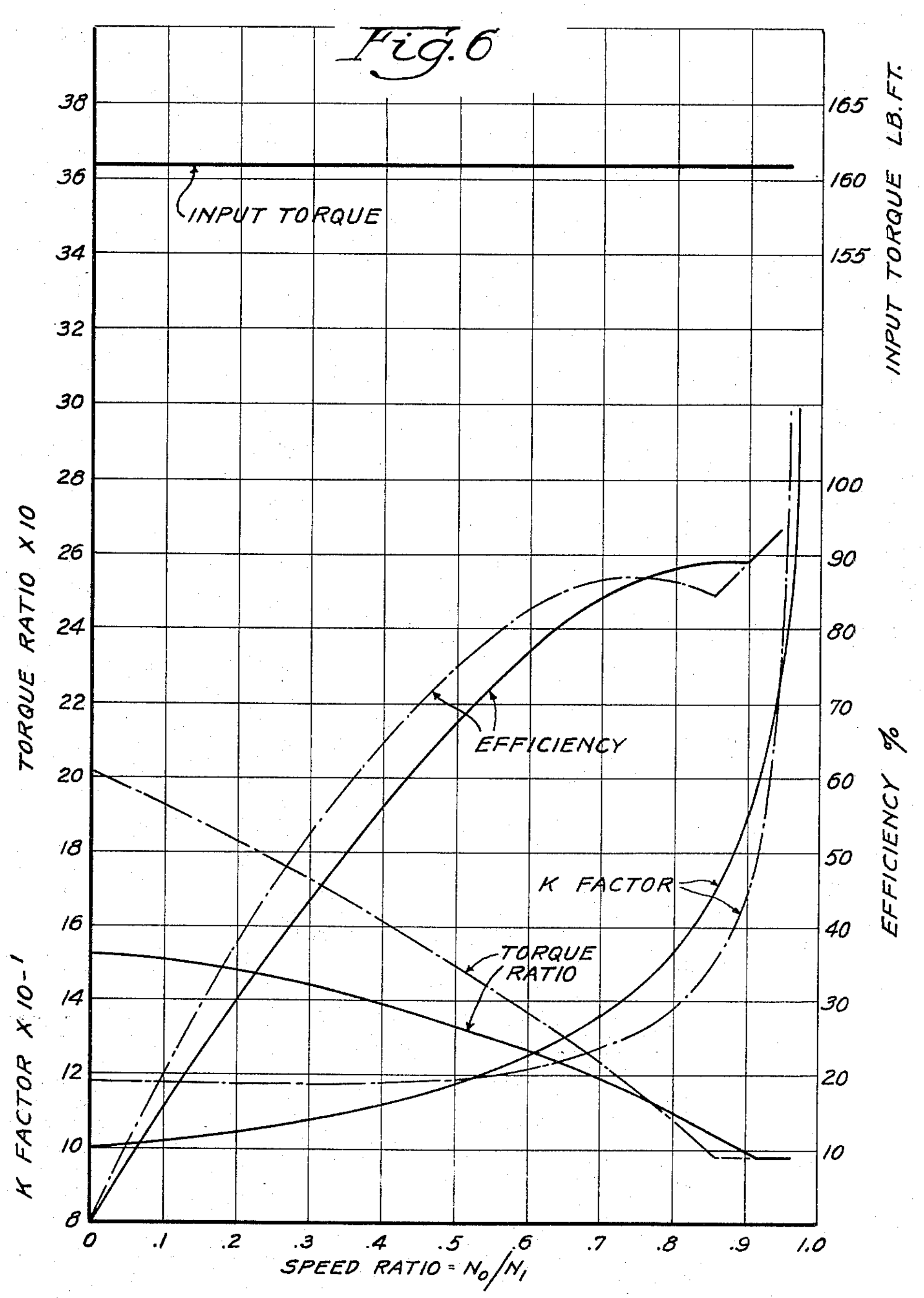
Figs. 6 and 7 are performance charts of hydraulic torque converters of the type disclosed in Figs. 1–5.

Referring to Figs. 6 and 7, it will be noted that at stall the value of K, with the converter having the curved vaned floater blades 66 and 74, was increased slightly. This indicates that the loading on the impeller under stall conditions was somewhat decreased. At the upper end of the torque conversion range performance is substantially improved. For example, the clutch point is extended to a speed ratio of approximately .9, and in the range of operation where the torque converter functions most of the time, namely at speed ratios of .8 and above, the efficiency curve for the Fig. 1 type converter is substantially above the efficiency curve for the conventional converter.

In order to provide a torque converter of the Fig. 1 type which provides higher torque multiplication at stall it is only necessary to so design the blades of the floater elements with entrance and exit angles of such magnitude as will produce substantially no effect under stall conditions and will provide maximum unloading of the impeller at the upper end of the torque conversion range near the clutch point. The blading of such a hydraulic torque converter is shown in Fig. 8.

Figure 8:
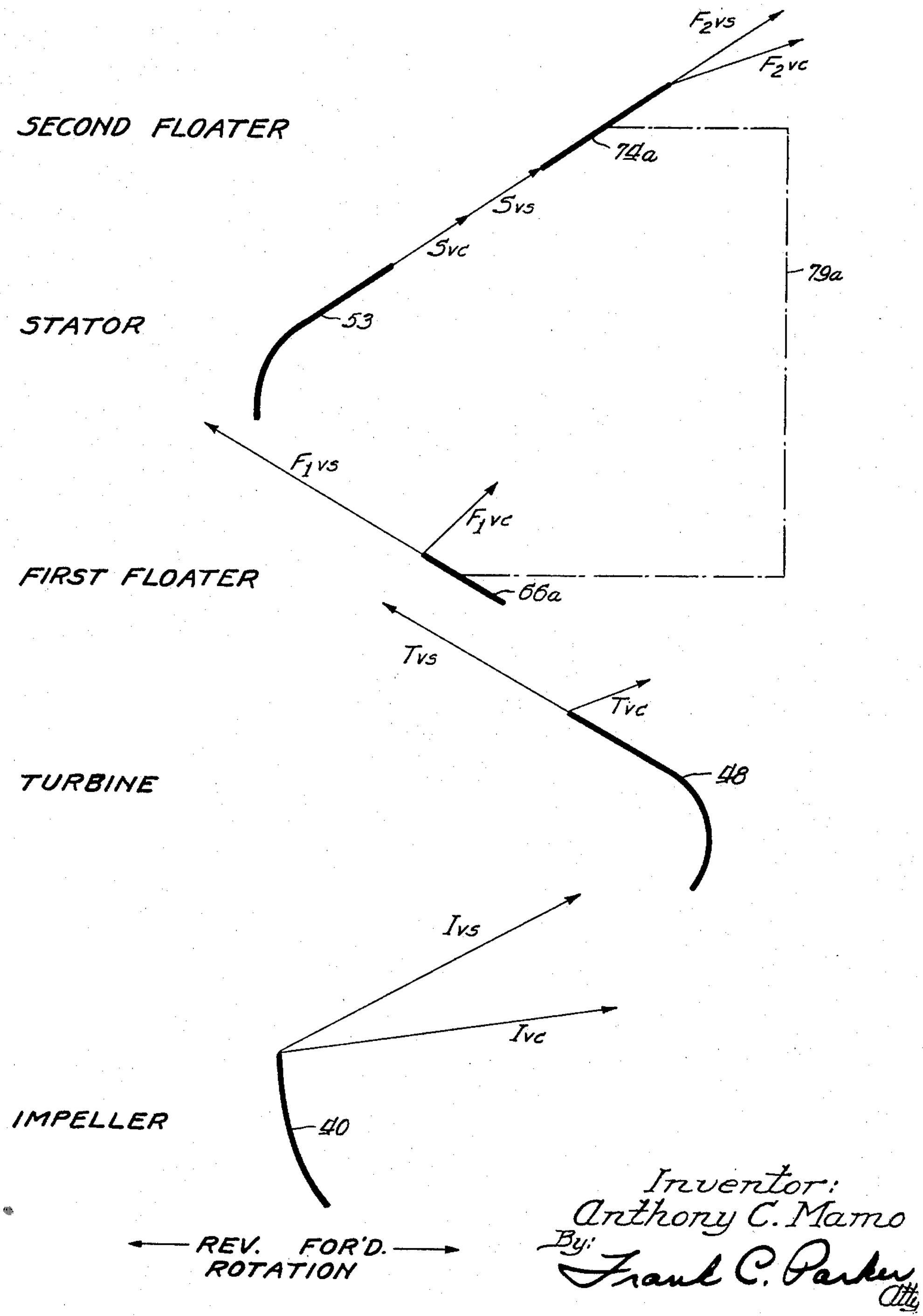
Fig. 8 is a diagram illustrating fluid flow during stall conditions and approximately at the clutch point in a hydraulic torque converter of the general type disclosed in Fig. 1 but having the first floater vanes disposed in approximately the same angular direction as the direction in which the fluid leaves the turbine during stall conditions.

Reference should now be had to Fig. 8 which shows a hydraulic torque converter of the type disclosed in Fig. 1 except that the first and second floater members have been somewhat modified. In the form of the torque converter shown in Fig. 8, the first floater vanes **66*a* are disposed at the same angle as the physical outlet angle of the turbine vanes 48. The second floater vanes 74*a* are disposed at the same angle as the physical outlet angle of the stator vanes 53**.

Vectors $Ivs$ and $Ivc$ respectively designate the absolute velocity of the fluid leaving the impeller vanes 40 during stall conditions and near the clutch point and it will be understood that throughout the entire torque conversion range the fluid flow is infinitely variable between the vectors $Ivs$ and $Ivc$. The vectors $Tvs$ and $Tvc$ respectively illustrate the absolute velocity of the fluid leaving the turbine respectively at the stall condition and during the conditions of operation near the clutch point. Similarly the direction of flow of the fluid leaving the turbine vanes 48 is infinitely variable between vectors $Tvs$ and $Tvc$. Vectors $F_1vs$ and $F_1vc$ illustrate the absolute velocity of the fluid leaving the first floater vanes **66*a* respectively at the stall condition and at the clutch point. Vectors $Svs$ and $Svc$ represent the absolute velocity of the fluid leaving the stator at stall and at the clutch point respectively. Vectors $F_2vs$ and $F_2vc$ represent the absolute velocity of the fluid leaving the second floater vanes 74*a*** at stall and at the clutch point.

It will be noted that in the modified form of the hydraulic torque converter disclosed in Fig. 8, at stall, the fluid enters the stator vanes 53 at the same angle as it leaves the turbine vanes 48. Also, at stall, the fluid entering the impeller does so at the same angle as the fluid leaves the stator vanes 53. As a result, during stall conditions of operation, the floater vanes **66*a* and 74*a* have substantially no effect on the operation of the converter. At this time it can therefore be stated that the hydraulic torque converter of Fig. 8 functions in the same manner as it would function were the first floater vanes 66a and second floater vanes 74a** omitted from the toroidal circuit.

As soon as the turbine vanes 48 commence to rotate, the fluid leaving the turbine does so at an angle increasingly forwardly with respect to the vector $Tvs$ and this fluid therefore impinges upon the reverse faces of the first floater vanes 66a. This tends to drive the interconnected floater vanes 66a and 74a in a forward direction. Thus, the fluid leaving the stator vanes 53 impinges against the forward faces of the second floater vanes 74a and is thereby deflected slightly forwardly with respect to the vector $F_2vs$. Thus, as the speed ratio between the turbine and impeller increases, the floater vanes 66a and 74a progressively infinitely variably unload the impeller 40. As a result, the velocity of the impeller increases with increasing speed ratios between the turbine and impeller and the driving engine is capable of speeding up to speeds where it is capable of developing greater horsepower.

It is contemplated that the modification disclosed in Fig. 8 could be used in those applications where it is not necessary to increase the torque handling capacity of the converter at stall but it is desired to increasingly unload the impeller with increasing speed ratios between the turbine and impeller.

Figure 9:
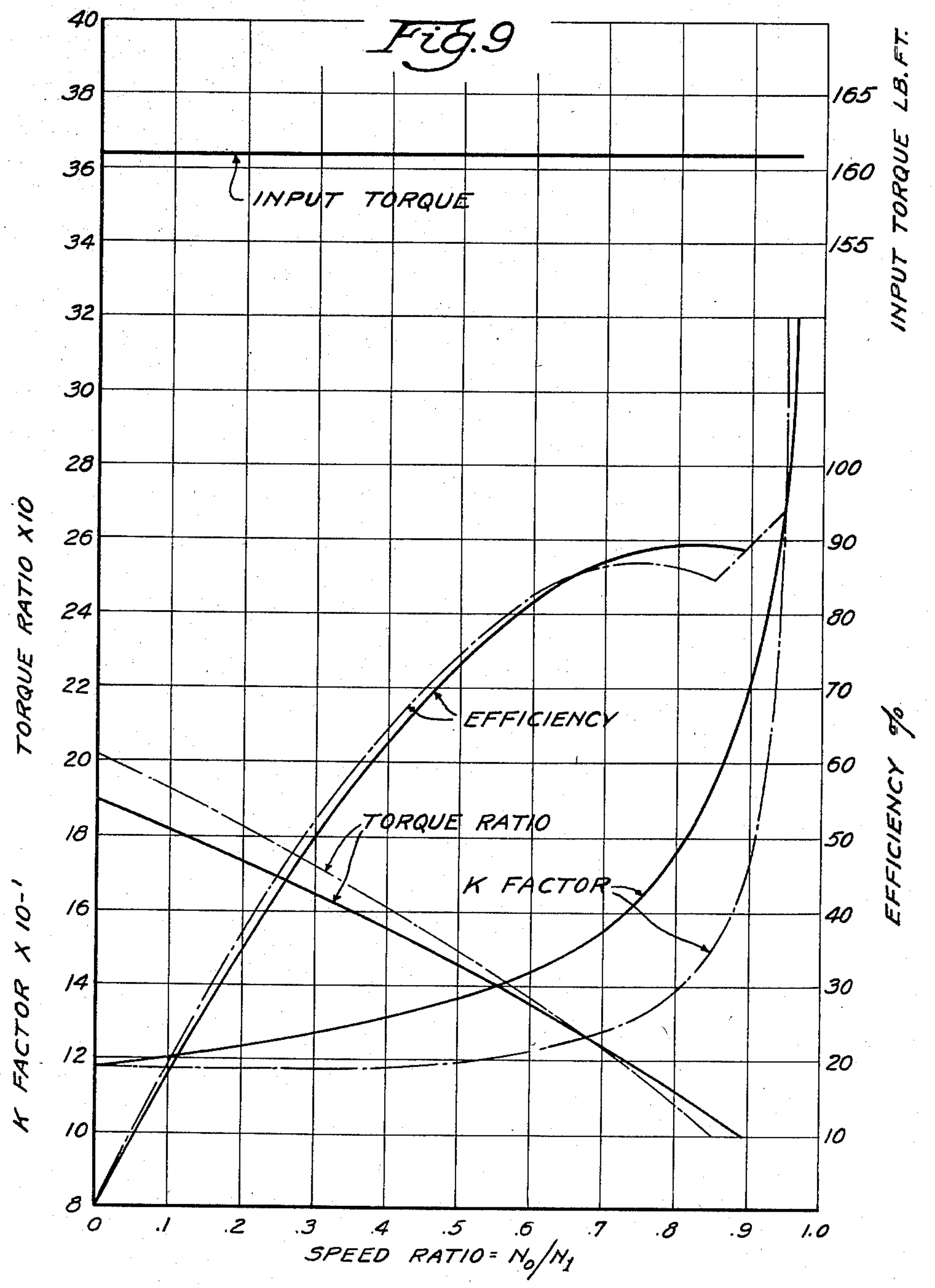
Fig. 9 is a performance chart of a hydraulic torque converter having the blading shown in Fig. 8.

Fig. 9, as has been stated hereinbefore shows the performance curves for a Fig. 1 type converter having the blade shapes of Fig. 8 as compared with the performance curves of a conventional torque converter as illustrated in Figs. 6 and 7. The solid lines in Fig. 9 refer to the Fig. 8 type converter and the dot-dash lines comprise the performance curves for the conventional converter.

Due to minor losses resulting from friction and shock, for example, the torque ratio curve for the Fig. 8 type converter is slightly below the torque ratio curve for the conventional converter from stall up to a speed ratio of the order of .65. Correspondingly the efficiency curve for the Fig. 8 type converter up to a speed ratio of approximately .65 is below the efficiency curve for the conventional converter. Above the .65 speed ratio, however, both the efficiency and the torque ratio curves for the Fig. 8 type converter are above the corresponding curves for the conventional converter.

Inasmuch as the span of any converter is a good indicia of the range of torque multiplication of the converter, the spans for the converters charted in Fig. 9 will be compared. It will be recalled that the span of any converter is equal to the difference between the value of K at the clutch point and the value of K at stall. With both converters illustrated in Fig. 9 the value of K at stall is approximately 118. The clutch point of the conventional converter represented in Fig. 9 occurs at a speed ratio of approximately .85, and the value of K at this point is approximately 150 so that the span of the conventional converter represented in Fig. 9 is approximately 32. The Fig. 8 type converter, as is apparent from Fig. 9, reaches its clutch point at a speed ratio of approximately .9 and at this speed ratio the value of K is approximately 220. Accordingly, the span of the Fig. 8 type converter is of the order of 100 or 102 which is substantially three times the span of the conventional converter. Therefore, with the Fig. 8 type converter, even though there is substantially no sacrifice of torque ratio at stall there is a substantial gain in efficiency and performance at the end of the torque conversion range in the vicinity of the clutch point.

For further purposes of comparison, the horsepower delivered to the driving wheels of the vehicle when the speed ratio is .85 and the engine torque is approximately 162 lb. ft., is approximately 66 horsepower for the Fig. 8 type converter and 49 horsepower for the conventional converter. With the same engine torque and at a speed ratio of .68, the Fig. 8 type converter would deliver approximately 50 horsepower to the driving wheels and the conventional converter would deliver 42 horsepower to the driving wheels. Due to the considerable unloading of the impeller with increasing speed ratios, the engine is capable of driving the impeller at increasingly higher speeds and thus enabling the converter to deliver the higher horsepower as is apparent from Fig. 9.

Figure 10:
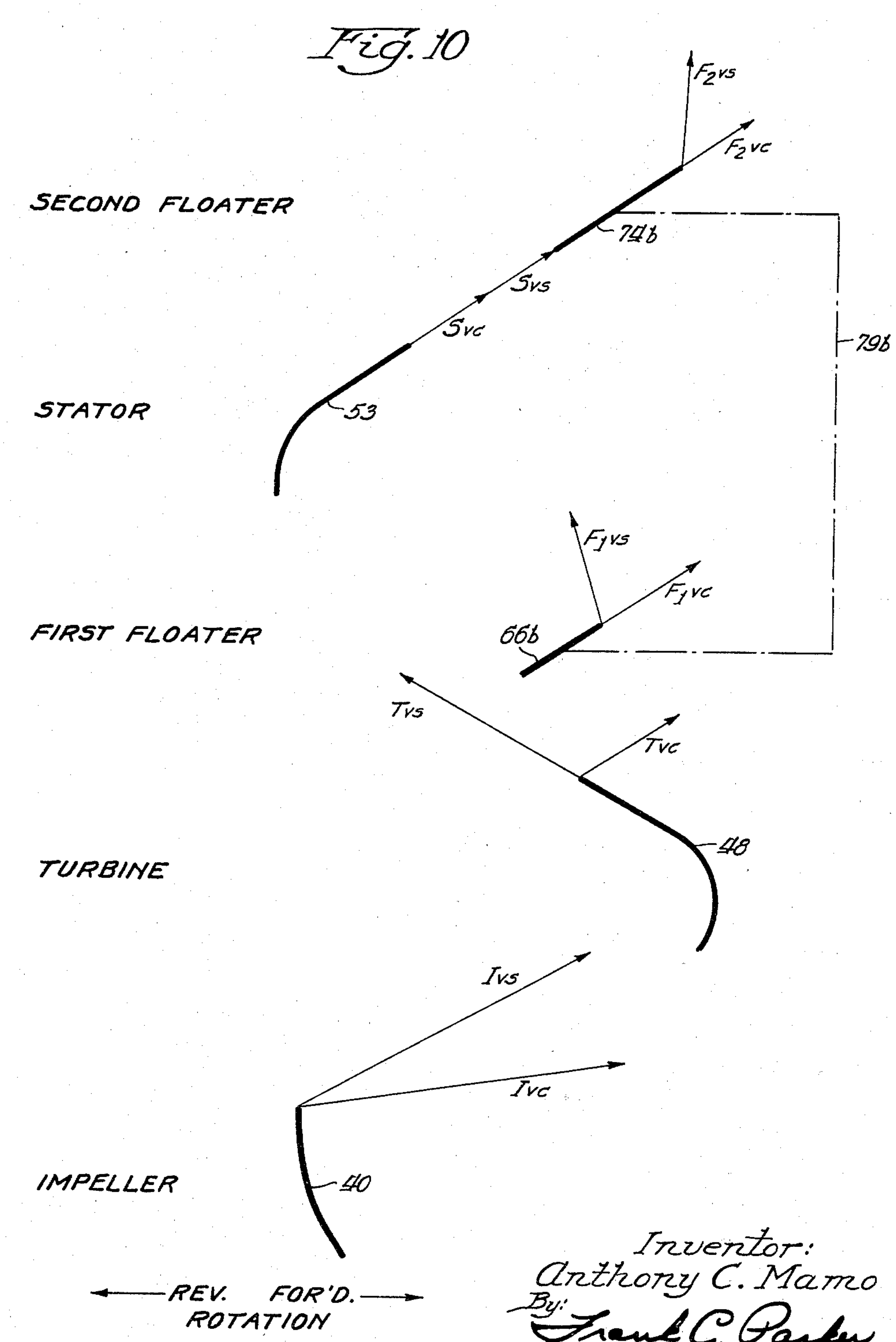
Fig. 10 is a diagram illustrating fluid flow during stall conditions and approximately at the clutch point in a hydraulic torque converter of the general type disclosed in Figs. 1–5 but having the first floater vanes disposed at substantially the same inclination as the direction of flow of the fluid leaving the turbine when the converter is operating at its clutch point.

Fig. 10 discloses a further modification of the form of hydraulic torque converter shown in Fig. 1. The hydraulic torque converter shown in Fig. 10 is like that shown in Fig. 8 except that the first floater vanes 66b are disposed very near to the angle at which the fluid leaves the turbine at the clutch point of the converter.

In the embodiment of the invention disclosed in Fig. 10 during the conditions when the converter is operating at its clutch point, the interconnected floater members 66b and 74b would have substantially no effect on the direction of flow of the fluid respectively entering the stator vanes 53 and the impeller vanes 40. However, during the entire torque conversion range, the combined effect of the first and second floater vanes 66b and 74b would be to load the impeller vanes 40 due to the deflection of the fluid prior to its entrance into the impeller vanes 40 in a reverse direction from the direction of flow of the fluid as it leaves the stator.

With the hydraulic torque converter disclosed in Fig. 10 loading of the impeller is at a maximum during stall conditions of operation and this loading progressively decreases up to the point where the clutch point is reached. The vector $F_2vs$ designates the absolute velocity of the fluid entering the impeller vanes 40 at stall and the vector $F_2vc$ designates the absolute velocity of the fluid entering the impeller vanes 40 at the clutch point.

A hydraulic torque converter constructed as shown in Fig. 10 would be suitable for use where it is desired to enable the converter to handle tremendous torques at low speed ratios and where there is no particular desire to unload the impeller at higher speed ratios between the turbine and impeller.

Due to the rather considerable loading of the impeller vanes 40 at stall with the Fig. 10 type converter, the torque handling capacity at stall is very substantial. Further, the K factor is substantially depressed at the lower or stall end of the torque conversion range, whereas the K factor approximates the K factor for a conventional converter at the higher speed ratio end of the torque conversion range in the vicinity of the clutch point.

Fig. 11 shows the blading for a hydraulic torque converter of the general type disclosed in Fig. 1 except that the floater member vanes 66c and 74c are so disposed as to provide maximum deflection of the fluid leaving the stator, that is, maximum impeller loading, throughout the entire torque conversion range from stall up through the clutch point.

In the embodiment of the invention disclosed in Fig. 11 the impeller vanes 40, turbine vanes 48 and stator vanes 53 are indicated by the same reference numerals as the corresponding vanes in the embodiment of the invention disclosed in Figs. 1–5. The first floater vanes 66c are disposed at approximately the same angle as the angle at which the fluid leaves the turbine vanes 48 when the converter is operating at its clutch point. The second floater vanes 74c are disposed substantially at right angles to the direction of flow of the fluid leaving the stator vanes 53 throughout the entire torque conversion range.

The absolute velocity of the fluid leaving the first floater vanes 66c at stall is designated by vector $F_1vs$ and at the clutch point by vector $F_1vc$. It will be noted that the fluid leaving the turbine vanes 48 throughout the entire torque conversion range is deflected in a forward direction to a substantial degree. The absolute velocity of the fluid leaving the second floater member vanes 74c at stall is represented by vector $F_2vs$ and at the clutch point by vector $F_2\,vc$.

With the blading shown in Fig. 11, as is apparent, the impeller loading is at a maximum at stall and the loading progressively variably decreases to a minimum near the clutch point.

Fig. 12 shows a further modification of the invention wherein the first floater member vanes *66d* are disposed at angles approximating the physical exit angles of the turbine vanes 48 and the second floater member vanes *74d* are directed slightly backwardly. The impeller vanes 40, turbine vanes 48 and stator vanes 53 are identical with the corresponding vanes in the converter disclosed in Figs. 1–5.

The absolute velocity of the fluid leaving the first floater vanes *66d* at stall is designated by vector $F_1vs$ and at the clutch point by vector $F_1vc$. The absolute velocity of the fluid leaving the second floater vanes *74d* at stall is represented by vector $F_2vs$ and at the clutch point by vector $F_2vc$.

From the various embodiments of the invention disclosed heretofore it is apparent that the angular disposition of the floater member vanes may be variable over a wide range of angles. More particularly, the invention contemplates that the limiting factor in determining the range of angular disposition of the floating member vanes, as well as the vanes of the impeller, turbine and stator, will arise from the choking effect on the fluid flowing through the vanes and encountered when a plurality of peripherally arranged vanes or blades are disposed at sharply acute angles with reference either to the direction of rotation of the vanes or to a direction 180 degrees from the direction of rotation of the vanes. In other words the present invention contemplates that the angular disposition of the first floater vanes may be anywhere between a direction very near to the direction of rotation of the vanes and a direction 180 degrees from the direction of rotation of the vanes. The present invention further contemplates that the second floater vanes may be angularly disposed in a similar manner.

Reference should now be had to Figs. 13–15 which illustrate the advantages attributable to a relatively high span converter of the Fig. 1 type as compared to a moderate span converter, when each is driven by an engine capable of performing in substantially the same manner as engines used in conventional present day automotive vehicles. In order to obtain a practical comparison which will not be complicated by differences between the torque ratios and efficiencies of the torque converters being compared and in order to avoid discrepancies which could possibly arise by reason of the fact that one converter is driven by one type of engine capable of performing in one manner while the other is driven by another type of engine capable of performing in a different manner, the same engine is used in both cases and everything except the K curves are identical for both converters. Consequently, any differences in output horsepowers and output torques are therefore due entirely to the effects of the differences between the K curves for the respective high and low span converters.

In Fig. 15 the solid lines designate the performance curves for the high span converter and the dashed lines identify the performance curves for the low span converter. In Fig. 13 the efficiencies, torque ratios, stall speeds and diameters are identical for both converters and these curves as well as the K curve for the high span converter, are represented by solid lines, whereas the K curve for the low span converter is represented by a dot-dash line. It will be noted that the high span converter has a span of 100 while the low span converter has a span of 50 which is slightly above the span for the average converter in automotive vehicles. It will further be noted that the curves for the high span converter in Fig. 13 approximate the performance curves shown in Fig. 9 for the Fig. 8 type converter with the floating members.

Fig. 14 is a diagram showing engine torque and the K factor for the driving engine of a typical passenger vehicle plotted against engine output speed. It will be noted that the engine torque reaches a maximum at approximately 1850 r.p.m. and then drops off gradually to a minimum at a speed of 4400 r.p.m. The K factor curve in Fig. 14 represents the value of engine speed divided by the square root of engine output torque plotted against engine output speed. When any converter is driven by a particular engine at a given speed the value of K for the converter and for the engine will be the same and since, in Fig. 13, the value of K at stall for both the high span and low span converters is 118.3, it is apparent that this value of K for the engine (from Fig. 14) occurs at an engine speed of 1490 r.p.m. and engine torque of 158.7 lb. ft. Since the vehicle in each case is stationary at stall, both the output horsepower and efficiency are zero (see Fig. 15). Further, at stall both converters have a torque multiplication factor of 2.1 so that the output torque delivered to the load is approximately 333 lb. ft. for each converter (also see Fig. 15).

As the vehicle begins to pick up speed the impeller to turbine speed ratio increases and the output torque and horsepower from the high span converter progressively increases over the output torque and horsepower from the low span converter. For example, at a speed ratio of .5 the value of K for the low span converter is 119.7. With this value of K, Fig. 14 shows that the engine rotates at 1508 r.p.m. and provides an output torque of 159 lb. ft. Since the torque ratio at a speed ratio of .5 is 1.55, the output torque is approximately 246 lb. ft. The output speed equals the input speed multiplied by the speed ratio, which in this instance is 754 r.p.m. and Fig. 15 shows that for an output speed of 754 r.p.m. the horsepower is approximately 35.

At a speed ratio of .5, the value of K for the high span converter is 139.5 and Fig. 14 shows that at this value of K the engine rotates at 1767 r.p.m. and delivers approximately 160 lb. ft. of torque. Since the torque ratio is 1.55 the output torque delivered to the vehicle driving wheels is approximately 248 lb. ft. which represents a slight increase over the output torque delivered by the low span converter at a speed ratio of .5, however, this slightly increased torque is being delivered at 884 r.p.m. instead of 754 r.p.m. Fig. 15 shows that under these conditions the output horsepower for the high span converter is approximately 42 as compared with an output horsepower of approximately 35 at the same speed ratio for the low span converter.

At a speed ratio of .8 the improved performance obtainable from the high span converter becomes even more pronounced. Under these conditions the value of K for the low span converter is 139 and Fig. 14 shows that at this value of K the engine rotates at 1750 r.p.m. and delivers an output torque of 159 lb. ft. The torque ratio for the low span converter at a speed ratio of .8 is 1.14 and therefore the output torque is approximately 182 lb. ft. The output or turbine speed is therefore 1400 r.p.m. and Fig. 15 shows that at this output speed the horsepower deliverable to the load is slightly under 49.

Under the same conditions, namely at a speed ratio of .8, the high span converter has a K value of 182 and Fig. 14 shows that the engine rotates at a speed of 2395 r.p.m. and delivers approximately 158 lb. ft. of torque. The output or turbine speed is thus approximately 1916 r.p.m. and since the torque ratio is 1.14, the output torque is approximately 180 lb. ft. Due, however, to the increased output speed under these conditions of operation with the high span converter, the output horsepower is approximately 65 as compared to an output horsepower of slightly under 49 for the low span converter when operating at a speed ratio of .8. Fig. 15, therefore, shows that the high span converter delivers substantially more torque and horsepower over the entire torque conversion range.

Fig. 13 illustrates the efficiency and torque ratio levels at which the moderate or low span converter would be required to operate in order for it to provide an output horsepower equal to the output horsepower from the high span converter when operating at a speed ratio of .8. At this speed ratio, as stated above, the turbine or output speed is 1400 r.p.m. for the low span converter. The output horsepower for the high span converter at a speed ratio of .8 has been shown to be approximately 65. From the horsepower formula set forth below, $$\text{Horsepower}=\frac{\text{Output torque}\times\text{Output speed}}{5252}$$

it follows that $$\text{Output torque}=\frac{\text{Horsepower (5252)}}{\text{Output speed}}$$

Substituting the above values in this equation gives $$\text{Output torque}=\frac{65\times 5252}{1400}=244 \text{ lb. ft.}$$

Recalling that the engine torque delivered to the low span converter is approximately 159 lb. ft. at a speed ratio of .8, then the torque ratio of the converter under these conditions would need to be approximately 1.54 in order for the converter to be capable of delivering an output torque of 244 lb. ft.

Inasmuch as the efficiency of the converter is equal to the torque ratio multiplied by the speed ratio multiplied by 100, the efficiency of the low span converter would need to be .8×1.54×100, which is approximately equal to 123%. Since the efficiency cannot exceed 100%, this further illustrates the fact that the low or moderate span converter cannot possibly provide an output horsepower as great as the high span converter.

Fig. 16 discloses a modified form of the invention having three rigidly interconnected floater members instead of the two interconnected floater members disclosed in the embodiment of the invention shown in Fig. 1. In the Fig. 16 modification of the hydraulic torque converter, a first floater member having vanes **66*e* is disposed in toroidally spaced relation between the turbine vanes 48*e* and stator vanes 53*e*. The second floater member having vanes 74*e* is disposed in toroidally spaced relation between the stator vanes 53*e* and the impeller vanes 40*e*. The third floater member having vanes 88*e* is disposed in toroidally spaced relation between the impeller vanes 40*e* and the turbine vanes 48*e*. Interconnecting means 79*e* are provided for rigidly interconnecting all three sets of floater vanes 66*e*, 74*e* and 88*e***. As will be apparent, energy may be absorbed from the toroidal fluid circuit by any one of the floater members under predetermined conditions of operation and given up to the fluid circuit by any one or more of the other floater members.

Fig. 17 discloses a further embodiment of the present invention and utilizes two separate floater members designated by vanes **74*f* and 88*f* respectively disposed in toroidally spaced relation between the stator vanes 53*f* and impeller vanes 74*f* and between the impeller vanes 40*f* and turbine vanes 48*f***.

Fig. 18 discloses another embodiment of the present invention utilizing but two sets of floater vanes **66*g* and 88*g*** with the floater members respectively being toroidally disposed between the impeller and turbine and turbine and stator.

Fig. 19 discloses a still further modification of the present invention utilizing a pair of rigidly interconnected floater members having vanes **89*h* and 90*h* respectively. In this embodiment the turbine means comprises toroidally spaced vaned portions 48*h*' and 48*h*''. The impeller means comprises portions 40*h*' and 40*h*'' which may or may not be rigidly interconnected with each other, as desired. The turbine means comprising toroidally spaced vaned portions 48*h*' and 48*h*'' may each be connected to the same output member or may be respectively connected to different output members. The first floater vanes 89*h* are toroidally disposed between the turbine portions 48*h*' and 48*h*'' while the second floater vanes 90*h* are toroidally disposed between the spaced impeller portions 40*h*' and 40*h*''**.

In the embodiment of the invention shown in Fig. 20, the turbine means are split as in Fig. 19 so as to provide toroidally spaced vaned turbine portions **48*i*' and 48*i*''. A first vaned floater member 89*i* is disposed in toroidally spaced relation between the turbine portions 48*i*' and 48*i*'' while a second floater member 74*i* is disposed in toroidally spaced relation between the stator vanes 53*i* and impeller vanes 40*i***.

In the Fig. 21 modification, the impeller means are split as in Fig. 19 to provide toroidally spaced impeller portions **40*j*' and 40*j*''. One vaned floater member 90*j* is disposed in toroidally spaced relation between the impeller portions 40*j*' and 40*j*'' while the other vaned floater member is toroidally disposed between the turbine vanes 48*j* and stator vanes 53*j***.

The embodiment of the invention disclosed in Fig. 22 is similar to the embodiment shown in Fig. 1, in that the first floater vanes **66*k* are toroidally disposed between the turbine vanes 48*k* and the stator vanes 53*k* while the second floater vanes 74*k* are toroidally disposed between the stator vanes 53*k* and the impeller vanes 40*k*. The interconnecting means 79*k* differs from the connection 79 in the Fig. 1 form of the invention. In Fig. 22, the interconnecting means 79*k* comprises a planetary gear set having a planet gear carrier 91 rigidly connected to the second floater vanes 74*k*. A ring gear 92 is rigidly connected with the first floater vanes 66*k* whereas a sun gear 93 is rigidly interconnected with the stator vanes 53*k*. A plurality of planetary pinions 94, rotatably mounted on the carrier 91, respectively mesh with ring gear 92 and sun gear 93 to provide a driving interconnection between the first and second floater vanes 66*k* and 74*k*. It will be apparent that as long as the torque converter shown in Fig. 22 is operating in its torque multiplication range, the stator 53*k* is stationary and the sun gear 93 serves as a reaction member for the planetary gear set 79*k*. Thus, during the torque conversion range there is a definite speed ratio between the floater vanes 66*k* and 74*k*** and torque is transmitted between these floaters at a definite torque ratio during the torque conversion range.

In the embodiment of the invention disclosed in Fig. 23, the vaned elements are like those in Fig. 1. The interconnecting means 791 comprises a one-way engaging device having an inner race 95 integrally connected with the second floater vanes 741 and an outer race 96 rigidly interconnected with the first floater vanes 661. A plurality of tiltable sprags or wedging elements 97 are operably disposed between the races 95 and 96 and are adapted to lock up the vaned members 661 and 741 upon any tendency thereof to rotate relatively in one direction and to release and enable free relative rotation between the vaned members 661 and 741 upon any tendency thereof to rotate relatively in the opposite direction.

In Fig. 24 the sprags 97' are disposed between the races 95' and 96' so that when the first floater vanes 661 tend to be driven in a backward direction the one-way clutch 791 locks up and enables the transmission of torque from the first floater vanes 661 to the second floating member vanes 741. As soon as the first floater member tends to be driven in a forward direction of rotation the one-way clutch 791 free-wheels and allows the floaters to rotate freely relative to each other.

In the embodiment of the invention disclosed in Fig. 24, therefore, the advantages attributable to the form of the torque converter shown in Fig. 1 are obtained during the relatively low speed ratio range and the torque converter functions as a conventional converter in the higher speed ratio range near the clutch point.

It will be recalled, from the discussion of Fig. 2, that the first floater tends to drive the second floater reversely during the lower speed ratio end of the torque conversion range and that the first floater tends to drive the second floater forwardly during the higher speed ratio end of the torque conversion range. Accordingly, the one-way clutch 791 locks up during the low speed ratio end of the torque conversion range and the converter functions like the Fig. 1 type converter at this time. At the higher speed ratio end of the torque conversion range the one-way clutch 791 overruns or free wheels and the converter functions like the conventional converter without the floating elements therein.

Fig. 26 shows the performance curves of the conventional converter, as illustrated in Fig. 7, in dot-dash lines and of the Fig. 1 type converter in dotted lines. The solid lines shown in Fig. 26 represent the performance curves for a torque converter of the type shown in Fig. 23, with the one-way clutch disposed as shown in Fig. 24. As is apparent, the one-way clutch is locked-up at stall and remains lock-up until the turbine to impeller speed ratio increases to approximately .65. At this speed ratio the fluid flow from the turbine vanes 481 is such as will tend to drive the first floater vanes 661 forwardly. The one-way clutch 791 therefore free wheels above the speed ratio of approximately .65. Thus this torque converter functions like the Fig. 1 type converter at speed ratios up to .65 and like a conventional converter without the floating members at speed ratios above .65.

It will be understood that the point where the one-way clutch 791 changes from a locked-up condition to free-wheeling is primarily dependent upon the angular disposition of the floater vanes 661 and 741 and this point can be changed by changing the floater vane angles. For example, if the first floater vanes 661 are directed more rearwardly than the vanes 66 in Figs. 2–5, then the change from a locked-up to a free-wheeling condition of the one-way clutch 791 would occur at a lower speed ratio than .65.

In the embodiment of the invention shown in Fig. 25, the sprags 97″ lock up when the first floater vanes 661 tend to rotate forwardly relative to the second floater vanes 741. This condition normally prevails at the upper or higher speed ratio end of the torque conversion range so that the desirable advantages attributable to the torque converter disclosed in Fig. 1 are obtained at the upper end of the torque conversion range without sacrificing torque ratio at the lower end of the torque conversion range.

Fig. 27 shows the performance curves of the Fig. 23 type of hydraulic torque converter having the one-way clutch 791 arranged as shown in Fig. 25. In Fig. 27, the performance curves of a conventional converter are represented by the dot dashed lines and the dash lines represent the performance curves of the Fig. 1 type converter as shown in Fig. 6. The solid lines represent the performance curves of the Fig. 23 type converter having the one-way clutch 791 disposed as shown in Fig. 25. Accordingly, this type of converter functions substantially like a conventional torque converter from stall up to a turbine to impeller speed ratio of approximately .54 and like the Fig. 1 type converter at higher speed ratios. The one-way clutch 791 thus overruns at the lower speed ratios and locks up at the higher speed ratios.

Although a plurality of different forms of the Fig. 1 type converter have been disclosed herein, as well as the several other modifications of the invention shown in Figs. 16–21, these modifications are not intended to be exhaustive, to any degree whatsoever, of the possible forms in which the present invention may be applied. Rather, the numerous embodiments disclosed are intended primarily to be indicative of the wide scope encompassed by the present invention. It is therefore contemplated that numerous and extensive additional modifications of the present invention may be made without departing from the spirit or scope thereof.

What is claimed is:

1. A hydraulic torque converter having a plurality of vaned elements together defining a substantially toroidal fluid circuit; all of said elements being rotatable about a common axis; said elements comprising vaned driving means for circulating the fluid through said toroidal circuit and thereby imparting kinetic energy to the fluid, vaned driven means for absorbing kinetic energy from the fluid, and vaned reaction means effective to change the direction of flow of the fluid for enabling the conversion of torque by said converter; and said elements further comprising toroidally spaced vaned floater means freely rotatable in either direction during all stages of operation of the converter and rotatable with respect to said driving, driven and reaction means, said toroidally spaced vaned floater means being drivingly interconnected and effective to transfer kinetic energy from one point in said toroidal circuit to another point in the circuit.

2. A hydraulic torque converter having a plurality of vaned elements together defining a substantially toroidal fluid circuit; all of said elements being rotatable about a common axis; said elements comprising vaned driving means for circulating the fluid through said toroidal circuit and thereby imparting kinetic energy to the fluid, vaned driven means for absorbing kinetic energy from the fluid, and vaned reaction means effective to change the direction of flow of the fluid for enabling the conversion of torque by said converter; and said elements further comprising at least two toroidally spaced vaned floaters freely rotatable in either direction during all stages of operation of the converter and rotatable with respect to said driving, driven and reaction means, said vaned floaters being drivingly interconnected with each other, whereby one of the floaters is effective to absorb kinetic energy from the fluid at one point in said toroidal circuit and another of said floaters is effective to give up this absorbed kinetic energy to the fluid at another point in the circuit.

3. A hydraulic torque converter comprising a plurality of toroidally arranged fluid circulating devices together defining a substantially toroidal fluid circuit and each of said devices having fluid passages therethrough; the entrances and exits of the fluid passages of adjacent ones of said devices being disposed adjacent each other; certain of said devices comprising primary elements including impeller, turbine and stator means for respectively imparting kinetic energy to a fluid being circulated through said circuit, absorbing kinetic energy from the circulating fluid and changing the direction of flow of the fluid so as to enable the conversion of torque by the converter; and others of said devices comprising a plurality of floater elements freely rotatable in either direction during all stages of operation of the converter and rotatable with respect to said primary elements and drivingly connected with each other, said floater elements being disposed with at least one of said primary elements positioned therebetween, whereby one of the floater elements absorbs kinetic energy from the point in the fluid circuit where the fluid leaves the passages of one of the primary elements and another of the floater elements gives up this absorbed kinetic energy to the fluid at the point in the fluid circuit where the fluid enters the passage of another of said primary elements.

4. A hydraulic torque converter having a plurality of vaned elements together defining a substantially toroidal fluid circuit; all of said elements being rotatable about a common axis; said elements comprising vaned driving means for circulating the fluid through said toroidal circuit and thereby imparting kinetic energy to the fluid, vaned driven means for absorbing kinetic energy from the fluid, and vaned reaction means effective to change the direction of flow of the fluid for enabling the conversion of torque by said converter; and said elements further comprising toroidally spaced vaned floater members respectively disposed adjacent to and on opposite sides of one of said vaned means; said floater members being freely rotatable in either direction during all stages of operation of the converter and rotatable about said axis with respect to said driving, driven and reaction means; and said toroidally spaced vaned floater members being drivingly interconnected and effective to transfer kinetic energy from one point in said toroidal circuit to another point in the circuit.

5. A hydraulic torque converter having a plurality of vaned elements together defining a substantially toroidal fluid circuit; all of said elements being rotatable about a common axis; said elements comprising vaned driving means for circulating the fluid through said toroidal circuit and thereby imparting kinetic energy to the fluid, vaned driven means for absorbing kinetic energy from the fluid, and vaned reaction means effective to change the direction of flow of the fluid for enabling the conversion of torque by said converter; and said elements further comprising a plurality of substantially rigidly interconnected vaned floater means respectively toroidally disposed between successive ones of said vaned driving, driven and reaction means and freely rotatable in either direction during all stages of operation of the converter and rotatable with respect to said driving, driven and reaction means; said vaned floater means being effective to transfer kinetic energy between different points in said toroidal circuit.

6. A hydraulic torque converter comprising a plurality of toroidally arranged fluid circulating devices together defining a substantially toroidal fluid circuit and each of said devices having fluid passages therethrough; the entrances and exits of the fluid passages of adjacent ones of said devices being disposed adjacent each other; certain of said devices comprising primary elements including impeller, turbine and stator means for respectively imparting kinetic energy to a fluid being circulated through said circuit, absorbing kinetic energy from the circulating fluid and changing the direction of flow of the fluid so as to enable the conversion of torque by the converter; and others of said devices including a pair of floater elements rotatable with respect to said primary elements and substantially rigidly connected with each other for rotation in unison, said floater elements being disposed respectively on opposite sides of and immediately adjacent to said stator means, whereby the floater elements absorb kinetic energy from the fluid circuit at one side of the stator means and give up this absorbed kinetic energy to the fluid circuit on the opposite side of said stator means.

7. A hydraulic torque converter having a plurality of vaned elements together defining a substantially toroidal fluid circuit; all of said elements being rotatable about a common axis; said elements comprising vaned impeller means for circulating the fluid through said toroidal circuit and thereby imparting kinetic energy to the fluid, vaned turbine means for absorbing kinetic energy from the fluid leaving the impeller means, and vaned stator means effective to change the direction of flow of the fluid leaving the turbine means and prior to its return to said impeller means for enabling the conversion of torque by said converter; and said elements further including a pair of substantially rigidly interconnected vaned floater members freely rotatable about said axis with respect to said impeller, turbine and stator means and disposed in toroidally spaced relation immediately adjacent to and respectively on oposite sides of said vaned stator means; said vaned floater members being effective to transfer kinetic energy from one side of said vaned stator means to the opposite side of said vaned stator means.

8. A hydraulic torque converter comprising a plurality of toroidally arranged fluid circulating devices together defining a substantially toroidal fluid circuit and each of said devices having fluid passages therethrough; the entrances and exists of the fluid passages of adjacent ones of said devices being disposed adjacent each other; certain of said devices comprising primary elements including an impeller, turbine and stator for respectively imparting kinetic energy to a fluid being circulated through said circuit, absorbing kinetic energy from the circulating fluid and changing the direction of flow of the fluid so as to enable the conversion of torque by the converter; and others of said devices comprising a pair of floater elements rotatable with respect to said primary elements and drivingly connected with each other; said impeller and turbine means being disposed with the fluid passages thereof immediately adjacent each other, one of said floater elements being disposed between and with its fluid passages respectively immediately adjacent the fluid passages of said turbine and stator and the other of said floater elements being disposed between and with its fluid passages respectively immediately adjacent the fluid passages of said stator and said impeller, whereby said one floater element absorbs kinetic energy from the point in the fluid circuit where the fluid leaves the passages of said turbine and the other of the floater elements gives up this absorbed kinetic energy to the fluid at the point in the fluid circuit where the fluid enters the passages of said impeller.

9. A hydraulic torque converter comprising a plurality of toroidally arranged fluid circulating devices together defining a substantially toroidal fluid circuit and each of said devices having fluid passages therethrough; the entrances and exits of the fluid passages of adjacent ones of said devices being disposed adjacent each other; certain of said devices comprising primary elements including an impeller, turbine and stator for respectively imparting kinetic energy to a fluid being circulated through said circuit, absorbing kinetic energy from the circulating fluid and changing the direction of flow of the fluid so as to enable the conversion of torque by the converter; and others of said devices comprising a pair of floater elements rotatable with respect to said primary elements and having a substantially one-to-one driving connection with each other; said impeller and turbine being disposed with the fluid passages thereof immediately adjacent each other, one of said floaters being disposed between and with its fluid passages respectively immediately adjacent the fluid passages of said turbine and stator and the other of said floaters being disposed between and with its fluid passages respectively immediately adjacent the fluid passages of said stator and impeller, whereby said one floater absorbs kinetic energy from the point in the fluid circuit where the fluid leaves the passages of said turbine and the other floater gives up this absorbed kinetic energy to the fluid at the point in the fluid circuit where the fluid enters the passages of said impeller.

10. A hydraulic torque converter having a plurality of elements together defining a substantially toroidal fluid circuit; all of said elements being rotatable about a common axis; said elements comprising a vaned impeller for circulating the fluid through said toroidal circuit and thereby imparting kinetic energy to the fluid, a vaned turbine disposed in the path of the circulating fluid for absorbing kinetic energy from the fluid leaving the impeller, a vaned stator effective to change the direction of flow of the fluid leaving the turbine and prior to its return to said impeller for enabling infinite variation of torque conversion by said converter over a range from a maximum to substantially no torque conversion; said elements further including first and second vaned floaters respectively toroidally disposed on opposite sides of said stator; means substantially rigidly drivingly interconnecting said floaters for enabling the transfer of torque therebetween; said floaters being freely rotatable about said axis with respect to said impeller, turbine and stator; the direction of flow of the fluid leaving said turbine vanes being infinitely variable in accordance with variations in said torque conversion between a first flow angle corresponding to said maximum torque conversion by the converter and a second flow angle corresponding to said substantially no torque conversion by the converter; the direction of flow of the fluid leaving said stator being substantially constant during the entire torque conversian range; the vanes of said first floater being disposed in the path of the circulating fluid at an angle lying between said first and second flow angles of the fluid leaving said turbine; the vanes of said second floater being adapted to change the direction of flow of the fluid leaving the stator before its reentry into said impeller; whereby, for a first predetermined range of said flow angles of the fluid leaving the turbine, said first floater is effective to absorb kinetic energy from the fluid which is transmitted as torque applied in one direction of rotation to the second floater which thereby imparts a flow component to the fluid entering the impeller in said one rotational direction and, for a second predetermined range of said flow angles of the fluid leaving the turbine, said first floater is effective to absorb kinetic energy from the fluid which is transmitted as torque applied in the opposite direction of rotation to the second floater which thereby imparts a flow component to the fluid entering the impeller in said opposite rotational direction.

11. A hydraulic torque converter adapted to multiply and transmit torque to a load from a driving engine of the type in which the efficiency increases with increasing speeds of the engine for at least a predetermined range of speeds of the engine, said torque converter having a plurality of elements together defining a substantially toroidal fluid circuit; all of said elements being rotatable about a common axis; said elements comprising a vaned impeller adapted to be drivingly connected with said engine and effective to circulate the fluid through said toroidal circuit and thereby impart kinetic energy to the fluid, a vaned turbine disposed in the path of the circulating fluid for absorbing kinetic energy from the fluid leaving the impeller, and a vaned stator effective to change the direction of flow of the fluid leaving the turbine and prior to its return to said impeller for enabling infinite variation of torque conversion by said converter over a range from a maximum to substantially no torque conversion; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the vanes of said first floater being disposed in the path of the circulating fluid as it leaves said turbine and being effective to absorb kinetic energy from the fluid leaving said turbine; the vanes of said second floater being disposed in the path of the circulating fluid as it leaves the stator and thereby being adapted to change the direction of flow of the fluid leaving the stator before its reentry into said impeller; whereby, with increasing speeds of rotation of said turbine, said floaters cooperate to progressively increasingly deflect the fluid leaving the stator in a forwardly direction so as to progressively increasingly unload said impeller and thereby enable the speed of the impeller to increase and in turn enable the engine to generate more horsepower.

12. A hydraulic torque converter having a plurality of elements together defining a substantially toroidal fluid circuit; all of said elements being rotatable about a common axis; said elements comprising a vaned impeller adapted to circulate fluid through said toroidal circuit and thereby impart kinetic energy to the fluid, a vaned turbine disposed in the path of the circulating fluid for absorbing kinetic energy from the fluid leaving the impeller, and a vaned stator effective to change the direction of flow of the fluid leaving the turbine and prior to its return to said impeller for enabling infinite variation of torque conversion by said converter over a torque conversion range from a maximum to substantially no torque conversion; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the direction of flow of the fluid leaving said turbine being infinitely variable throughout said torque conversion range; and the vanes of said floaters being effectively disposed in the path of the circulating fluid as it respectively leaves said turbine and stator and said floaters thereby being effective, throughout said torque conversion range, to impart a backward flow component to the fluid leaving said turbine and prior to its entry into the stator; whereby said torque conversion occurs over a range of directions of flow of the fluid leaving the turbine including fluid flow directions having a greater forward component than the direction of flow of the fluid leaving the stator during said torque conversion range.

13. A hydraulic torque converter having a plurality of elements together defining a substantially toroidal fluid circuit; all of said elements being rotatable about a common axis; said elements comprising a vaned impeller adapted to circulate the fluid through said toroidal circuit and thereby impart kinetic energy to the fluid, a vaned turbine disposed in the path of the circulating fluid for absorbing kinetic energy from the fluid leaving the impeller, and a vaned stator having one-way engaging means associated therewith for preventing backward rotation thereof and thereby being effective to change the direction of flow of the fluid leaving the turbine and prior to its return to said impeller for enabling infinite variation of torque conversion by said converter over a torque conversion range from a maximum to substantially no torque conversion and over a predetermined range of speed ratios between said turbine and said impeller; said one-way engaging means being effective to permit said stator to rotate freely in a forward direction over a second predetermined range of speed ratios between said turbine and said impeller while the converter is not converting torque; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the direction of flow of the fluid leaving said turbine being infinitely variable throughout said torque conversion range; and the vanes of said floaters being effectively disposed in the path of the circulating fluid as it respectively leaves said turbine and stator and said floaters thereby being effective, throughout said torque conversion range, to impart a backward flow component to the fluid leaving said turbine and prior to its entry into the stator; whereby said torque conversion occurs over a range of directions of flow of the fluid leaving the turbine including fluid flow directions having a greater forward component than the direction of flow of the fluid leaving the stator during said torque conversion range.

14. A hydraulic torque converter having a plurality of elements together defining a substantially toroidal fluid circuit; all of said elements being rotatable about a common axis; said elements comprising a vaned impeller adapted to circulate the fluid through said toroidal circuit and thereby impart kinetic energy to the fluid, a vaned turbine disposed in the path of the circulating fluid for absorbing kinetic energy from the fluid leaving the impeller, and a vaned stator effective to change the direction of flow of the fluid leaving the turbine and prior to its return to said impeller for enabling infinite variation of torque conversion by said converter over a torque conversion range from a maximum to substantially no torque conversion; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the direction of flow of the fluid leaving said turbine being infinitely variable throughout said torque conversion range; the vanes of said floaters being effectively disposed in the path of the circulating fluid as it respectively leaves said turbine and stator such that the fluid leaving the stator impinges against the vanes of the second floater to cause the latter to brake rotation of the drivingly interconnected floaters whereby the first floater is thereby rendered effective to impart a backward flow component to the fluid leaving said turbine and prior to its entry into the stator so that said torque conversion occurs over a range of directions of flow of the fluid leaving the turbine including fluid flow directions having a greater forward component than the direction of flow of the fluid leaving the stator during said torque conversion range.

15. A hydraulic torque converter having a plurality of elements together defining a substantially toroidal fluid circuit; all of said elements being rotatable about a common axis; said elements comprising a vaned impeller adapted to circulate the fluid through said toroidal circuit and thereby impart kinetic energy to the fluid, a vaned turbine disposed in the path of the circulating fluid for absorbing kinetic energy from the fluid leaving the impeller, and a vaned stator effective to change the direction of flow of the fluid leaving the turbine and prior to its return to said impeller for enabling infinite variation of torque conversion by said converter over a torque conversion range from a maximum to substantially no torque conversion; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the direction of flow of the fluid leaving said turbine being infinitely variable throughout said torque conversion range; the vanes of said floaters being effectively disposed in the path of the circulating fluid as it respectively leaves said turbine and stator such that the fluid leaving the stator impinges against the vanes of the second floater to cause the latter to brake rotation of the drivingly interconnected floaters whereby, for at least all forward directions of flow of the fluid leaving the turbine, the first floater is thereby rendered effective to deflect backwardly the fluid leaving said turbine and prior to its entry into the stator so that said torque conversion occurs over a range of directions of flow of the fluid leaving the turbine including fluid flow directions having a greater forward component than the direction of flow of the fluid leaving the stator during said torque conversion range.

16. A hydraulic torque converter having a plurality of elements together defining a substantially toroidal fluid circuit; all of said elements being rotatable about a common axis; said elements comprising a vaned impeller adapted to circulate the fluid through said toroidal circuit and thereby impart kinetic energy to the fluid, a vaned turbine disposed in the path of the circulating fluid for absorbing kinetic energy from the fluid leaving the impeller, and a vaned stator effective to change the direction of flow of the fluid leaving the turbine and prior to its return to said impeller for enabling infinite variation of torque conversion by said converter over a torque conversion range from a maximum to substantially no torque conversion; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the direction of flow of the fluid leaving said turbine being infinitely variable throughout said torque conversion range; the vanes of said floaters being effectively disposed in the path of the circulating fluid as it respectively leaves said turbine and stator such that the fluid leaving the stator impinges against the vanes of the second floater to cause the latter to brake rotation of the drivingly interconnected floaters and, for all forward directions of flow of the fluid leaving the turbine, the fluid impinges against the backwardly facing sides of the vanes of the first floaters, whereby the first floater is thereby rendered effective to deflect backwardly the fluid leaving said turbine and prior to its entry into the stator so that said torque conversion occurs over a range of directions of flow of the fluid leaving the turbine including fluid flow directions having a greater forward component than the direction of flow of the fluid leaving the stator during said torque conversion range.

17. A hydraulic torque converter having a plurality of elements together defining a substantially toroidal fluid circuit; all of said elements being rotatable about a common axis; said elements comprising a vaned impeller adapted to circulate the fluid through said toroidal circuit and thereby impart kinetic energy to the fluid, a vaned turbine disposed in the path of the circulating fluid for absorbing kinetic energy from the fluid leaving the impeller, and a vaned stator effective to change the direction of flow of the fluid leaving the turbine and prior to its return to said impeller for enabling infinite variation of torque conversion by said converter over a torque conversion range from a maximum to substantially no torque conversion; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the direction of flow of the fluid leaving said turbine being infinitely variable throughout said torque conversion range; the vanes of said first floater being disposed in a predetermined direction lying within the limits of the directions of the flow of the fluid leaving said turbine during said torque conversion range; and the vanes of said second floater being disposed in the general direction of flow of the fluid leaving said stator during the torque conversion range such that the fluid leaving the stator impinges against the second floater vanes to cause the latter to brake rotation of the drivingly interconnected floaters whereby, for all directions of flow of the fluid leaving the turbine forwardly with respect to said first floater vanes, the first floater is effective to deflect backwardly the fluid leaving said turbine and prior to its entry into the stator so that said torque conversion occurs over a range of directions of flow of the fluid leaving the turbine including fluid flow directions having a greater forward component than the direction of flow of the fluid leaving the stator during said torque conversion range.

18. A hydraulic torque converter having a plurality of elements together defining a substantially toroidal fluid circuit; all of said elements being rotatable about a common axis; said elements comprising a vaned impeller adapted to circulate the fluid through said toroidal circuit and thereby impart kinetic energy to the fluid, a vaned turbine disposed in the path of the circulating fluid for absorbing kinetic energy from the fluid leaving the impeller, and a vaned stator effective to change the direction of flow of the fluid leaving the turbine and prior to its return to said impeller for enabling infinite variation of torque conversion by said converter over a torque conversion range from a maximum to substantially no torque conversion; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the direction of flow of the fluid leaving said turbine being infinitely variable throughout said torque conversion range; the vanes of said first floater being disposed in a predetermined direction lying forwardly relative to the direction of flow of the fluid leaving the turbine during maximum torque conversion; and the vanes of said second floater being disposed in the general direction of flow of the fluid leaving said stator during the torque conversion range such that the fluid leaving the stator impinges against the second floater vanes to cause the latter to brake rotation of the drivingly interconnected floaters whereby, for all directions of flow of the fluid leaving the turbine forwardly with respect to said first floater vanes, the first floater is effective to deflect backwardly the fluid leaving said turbine and prior to its entry into the stator so that said torque conversion occurs over a range of directions of flow of the fluid leaving the turbine including fluid flow directions having a greater forward component than the direction of flow of the fluid leaving the stator during said torque conversion range.

19. A hydraulic torque converter having a plurality of elements together defining a substantially toroidal fluid circuit; all of said elements being rotatable about a common axis; said elements comprising vaned impeller means for circulating the fluid through said toroidal circuit and thereby imparting kinetic energy to the fluid, vaned turbine means disposed in the path of the circulating fluid for absorbing kinetic energy from the fluid leaving the impeller means, vaned stator means effective to change the direction of flow of the fluid leaving the turbine means and prior to its return to said impeller means for enabling infinite variation of torque conversion by said converter over a range from a maximum to substantially no torque conversion; said elements further including first and second vaned floater means respectively toroidally disposed on opposite sides of said vaned stator means; means drivingly interconnecting said floater means for enabling the transfer of torque therebetween; said floater means being freely rotatable about said axis with respect to said impeller, turbine and stator means; the direction of flow of the fluid entering one of said vaned floater means being infinitely variable between different predetermined flow angles in accordance with variations in said torque conversion by the converter; the vanes of said one floater means being disposed in the path of the circulating fluid at predetermined angles so that the one floater means is infinitely variably acted upon by the fluid entering said one floater means; and the vanes of the second floater means being adapted to infinitely vary the direction of flow of the fluid leaving the second floater means; whereby said two floater means cooperate with each other to provide infinite variation in the direction of flow of the fluid leaving the second floater means.

20. A hydraulic torque converter having a plurality of elements together defining a substantially toroidal fluid circuit; all of said elements being rotatable about a common axis; said elements comprising a vaned impeller for circulating the fluid through said toroidal circuit and thereby imparting kinetic energy to the fluid, a vaned turbine disposed in the path of the circulating fluid for absorbing kinetic energy from the fluid leaving the impeller, and a vaned stator effective to change the direction of flow of he fluid leaving the turbine and prior to its return to said impeller for enabling infinite variation of torque converison by said converter over a range from a maximum to substantially no torque conversion; said elements further including first and second vaned floaters respectively toroidally disposed on opposite sides of said vaned stator; means drivingly interconnectng said floaters for enabling the transfer of torque therebetween; said floaters being freely rotatable about said axis with respect to said impeller, turbine and stator; the direction of flow of the fluid entering said first vaned floater being infinitely variable between different predetermined backward and forward directions in accordance with variations in said torque conversion by the converter; the vanes of said first floater being disposed in the path of the circulating fluid at predetermined angles so that the first floater is infinitely variably acted upon by the fluid entering said first floater; and the vanes of the second floater being adapted to infinitely vary the direction of flow of the fluid leaving the second floater and entering the impeller between a first predetermined direction of flow having a minimum forward component and corresponding to maximum torque conversion by the converter and a second predetermined direction of flow having a maximum forward component and corresponding to said substantially no torque conversion by the converter; whereby said two floaters cooperate with each other in a manner tending to load the impeller so as to increase the torque handling capacity of the converter during maximum torque conversion and tending to unload the impeller so as to facilitate increasing the speed of rotation thereof during said no torque conversion.

21. A hydraulic torque converter adapted to multiply and transmit torque to a load from a driving engine of the type in which the efficiency increases with increasing speeds of the engine for at least a predetermined range of speeds of the engine, said torque converter having a plurality of elements together defining a substantially toroidal fluid circuit; all of said elements being rotatable about a common axis; said elements comprising a vaned impeller adapted to be drivingly connected with said engine and effective to circulate the fluid through said toroidal circuit and thereby impart kinetic energy to the fluid, a vaned turbine disposed in the path of the circulating fluid for absorbing kinetic energy from the fluid leaving the impeller, a vaned stator effective to change the direction of flow of the fluid leaving the turbine and prior to its return to said impeller for enabling infinite variation of torque conversion by said converter over a range from a maximum to substantially no torque conversion; said elements further including first and second vaned floaters respectively toroidally disposed on opposite sides of said stator; means drivingly interconnecting said floaters for enabling the transfer of torque therebetween; said floaters being freely rotatable about said axis with respect to said impeller, turbine and stator; the direction of flow of the fluid leaving said stator being substantially constant during the entire torque conversion range; the direction of flow of the fluid leaving said turbine being infinitely variable between a predetermined backward direction of flow corresponding to said maximum torque conversion and a predetermined forward direction of flow corresponding to said no torque conversion; the vanes of said first floater being disposed in the path of the circulating fluid as it leaves said turbine and being effective to absorb kinetic energy from the fluid leaving said turbine such that the floaters are subjected to infinitely variable rotational forces tending to infinitely variably drive them backwardly at a maximum speed during maximum torque conversion and forwardly at a predetermined speed when the condition of no torque conversion is reached; and the vanes of said second floater being disposed in the path of the circulating fluid as it leaves the stator and thereby being adapted to infinitely variably deflect the fluid leaving the stator before its reentry into said impeller so as to progressively increasingly unload said impeller and thereby enable the speed of the impeller to increase and in turn enable the engine to generate more horsepower.

References Cited in the file of this patent

UNITED STATES PATENTS

| | | |
|---|---|---|
| 2,196,585 | Gette | Apr. 9, 1940 |
| 2,710,504 | Dodge | June 14, 1955 |
| 2,762,197 | Ullery | Sept. 11, 1956 |

UNITED STATES PATENT OFFICE

CERTIFICATION OF CORRECTION

Patent No. 2,954,672 October 4, 1960

Anthony C. Mamo

It is hereby certified that error appears in the above numbered patent requiring correction and that the said Letters Patent should read as corrected below.

Column 2, line 67, after "lower" insert -- speed --; column 3, line 44, for "changes" read -- change --; column 9, line 38, for "vnaes" read -- vanes --; line 39, for "Tas" read -- Tqs --; line 57, for "revserely" read -- reversely --; column 17, line 16, for "1.09-(-2.05)=-.96" read -- -1.09-(-2.05) =+.96 --; line 72, for "cubit" read -- cubic --; column 18, line 16, for"conventiinal" read -- conventional --; line 35, for "(lbs. ft.)" read -- (lb. ft.) --; line 67, for "Imc-Sms" read -- Imc-Smc --; column 20, line 42, for "37 r.p.m." read -- 37 MPH --; column 31, line 68, for "oposite" read -- opposite --; column 33, line 7, for "conversian" read -- conversion --.

Signed and sealed this 25th day of April 1961.

(SEAL)

Attest:

ERNEST W. SWIDER

Attesting Officer

DAVID L. LADD

Commissioner of Patents